United States Patent
Fishman et al.

(10) Patent No.: US 12,389,081 B2
(45) Date of Patent: Aug. 12, 2025

(54) INTERACTIVE NOTIFICATIONS BETWEEN A MEDIA DEVICE AND A SECONDARY DEVICE

(71) Applicant: OpenTV, Inc., San Francisco, CA (US)

(72) Inventors: Alexander Fishman, San Francisco, CA (US); Eunsook An, San Francisco, CA (US); Danielle Zimmerman, San Francisco, CA (US); Crx Chai, San Francisco, CA (US); Colin Zhao, Sunnyvale, CA (US)

(73) Assignee: OPENTV, INC., San Francisco, CA (US)

( * ) Notice: Subject to any disclaimer, the term of this patent is extended or adjusted under 35 U.S.C. 154(b) by 48 days.

(21) Appl. No.: 16/645,125

(22) PCT Filed: Sep. 7, 2018

(86) PCT No.: PCT/US2018/050048
§ 371 (c)(1),
(2) Date: Mar. 6, 2020

(87) PCT Pub. No.: WO2019/060149
PCT Pub. Date: Mar. 28, 2019

(65) Prior Publication Data
US 2021/0092471 A1 Mar. 25, 2021

Related U.S. Application Data

(60) Provisional application No. 62/580,939, filed on Nov. 2, 2017, provisional application No. 62/556,416, filed on Sep. 9, 2017.

(51) Int. Cl.
*H04N 21/41* (2011.01)
*H04N 21/239* (2011.01)
(Continued)

(52) U.S. Cl.
CPC ..... *H04N 21/6334* (2013.01); *H04N 21/2393* (2013.01); *H04N 21/25866* (2013.01);
(Continued)

(58) Field of Classification Search
CPC .......... H04N 21/4126; H04N 21/4182; H04N 21/4532; H04N 21/6587; H04N 21/41407; H04N 21/4222
See application file for complete search history.

(56) References Cited

U.S. PATENT DOCUMENTS 10,440,169 B1 * 10/2019 Gordon ............... G06F 3/04886
2006/0025132 A1 * 2/2006 Karaoguz ............... H04M 1/56
455/433
(Continued)

FOREIGN PATENT DOCUMENTS

WO 2016/0048365 A1 3/2016
WO 2019/060149 A1 3/2019

OTHER PUBLICATIONS

International Search Report and Written Opinion of Nov. 29, 2018 for International PCT Application No. PCT/US2018/050048; 8 pages.
(Continued)

*Primary Examiner* — Pinkal R Chokshi
(74) *Attorney, Agent, or Firm* — POLSINELLI LLP

(57) ABSTRACT

A method includes obtaining an association of a client device with the secondary device. The method further includes identifying a triggering event related to an operation of the secondary device. The method also includes responsive to identifying the triggering event, sending, by the secondary device via a network, a message to the client device with a request for information related to the operation of the secondary device. The client device may have a client device interface configured to present the message and to
(Continued)

receive input pertaining to the message. The method includes receiving, via a network, input pertaining to the information from the client device. The method further includes configuring the secondary device to perform the operation at the secondary device using the input received from the client device.

16 Claims, 20 Drawing Sheets

(51) Int. Cl.
　　*H04N 21/258* (2011.01)
　　*H04N 21/418* (2011.01)
　　*H04N 21/45* (2011.01)
　　*H04N 21/454* (2011.01)
　　*H04N 21/466* (2011.01)
　　*H04N 21/475* (2011.01)
　　*H04N 21/482* (2011.01)
　　*H04N 21/6334* (2011.01)
　　*H04N 21/6587* (2011.01)

(52) U.S. Cl.
　　CPC ... *H04N 21/41265* (2020.08); *H04N 21/4182* (2013.01); *H04N 21/4532* (2013.01); *H04N 21/454* (2013.01); *H04N 21/4668* (2013.01); *H04N 21/4751* (2013.01); *H04N 21/4753* (2013.01); *H04N 21/482* (2013.01); *H04N 21/6587* (2013.01)

(56) References Cited

U.S. PATENT DOCUMENTS

| | | | |
|---|---|---|---|
| 2009/0150553 A1* | 6/2009 | Collart | H04L 65/612 |
| | | | 709/229 |
| 2010/0317332 A1* | 12/2010 | Bathiche | H04B 1/202 |
| | | | 455/418 |
| 2012/0089923 A1 | 4/2012 | Pettit | |
| 2012/0189140 A1* | 7/2012 | Hughes | H04M 3/56 |
| | | | 381/123 |
| 2014/0208342 A1 | 7/2014 | Chou et al. | |
| 2014/0320398 A1* | 10/2014 | Papstein | H04M 1/72412 |
| | | | 345/156 |
| 2014/0364056 A1 | 12/2014 | Belk et al. | |
| 2015/0193198 A1* | 7/2015 | Hutchings | H04N 21/43615 |
| | | | 700/94 |
| 2015/0370323 A1 | 12/2015 | Cieplinski | |
| 2016/0173929 A1* | 6/2016 | Klappert | H04N 21/4516 |
| | | | 725/25 |
| 2016/0234295 A1 | 8/2016 | Ziring et al. | |
| 2016/0295263 A1* | 10/2016 | Fix | H04N 21/222 |
| 2017/0013300 A1* | 1/2017 | McMahon | G08C 17/00 |
| 2017/0150227 A1* | 5/2017 | Kim | H04N 21/47815 |
| 2017/0163438 A1* | 6/2017 | Gary, Jr. | H04L 67/2814 |
| 2017/0228040 A1 | 8/2017 | Papstein | |
| 2017/0255345 A1* | 9/2017 | Veeramani | G06F 3/0481 |
| 2017/0332036 A1* | 11/2017 | Panchaksharaiah | H04N 5/45 |
| 2018/0053003 A1* | 2/2018 | Nair | H04L 63/0457 |
| 2018/0077442 A1* | 3/2018 | Herz | H04N 21/41407 |
| 2019/0028781 A1* | 1/2019 | Bigio | H04N 21/43615 |
| 2020/0201495 A1* | 6/2020 | Coffman | H04N 21/42203 |
| 2021/0266640 A1* | 8/2021 | Nasir | H04N 21/4826 |

OTHER PUBLICATIONS

Extended European Search Report of May 4, 2020 for European Patent Application No. 18858366.0; 8 pages.
Extended European Search Report of Mar. 18, 2024 for European Patent Application No. 23220226.7; 9 pages.

* cited by examiner

INTERACTIVE NOTIFICATIONS BETWEEN A MEDIA DEVICE AND A SECONDARY DEVICE

CROSS-REFERENCES TO RELATED APPLICATIONS

This application is a U.S. National Stage of PCT Application No. PCT/2018/050048, filed Sep. 7, 2018, which claims priority to U.S. Provisional Application No. 62/556,416, filed Sep. 9, 2017, and U.S. Provisional Application No. 62/580,939, filed Nov. 2, 2017, the entire contents of each of which are incorporated herein by reference in their entirety for all purposes.

FIELD

The embodiments discussed herein are related to interactive notifications between a media device and a secondary device.

BACKGROUND

As technology advances, newer devices may include additional features and functionality as compared to previous devices. Often, however, a focus is placed on releasing these additional features and functionality at the expense of developing technological improvements to be able to use these additional features and functionality.

The subject matter claimed herein is not limited to embodiments that solve any disadvantages or that operate only in environments such as those described above. Rather, this background is only provided to illustrate one example technology area where some embodiments described herein may be practiced. Further, unless otherwise indicated, the materials described in the background section are not prior art to the claims in the present application and are not admitted to be prior art by inclusion in this section.

BRIEF DESCRIPTION OF THE DRAWINGS

Example embodiments will be described and explained with additional specificity and detail through the use of the accompanying drawings in which.

DETAILED DESCRIPTION OF THE DRAWINGS

Figure 1:
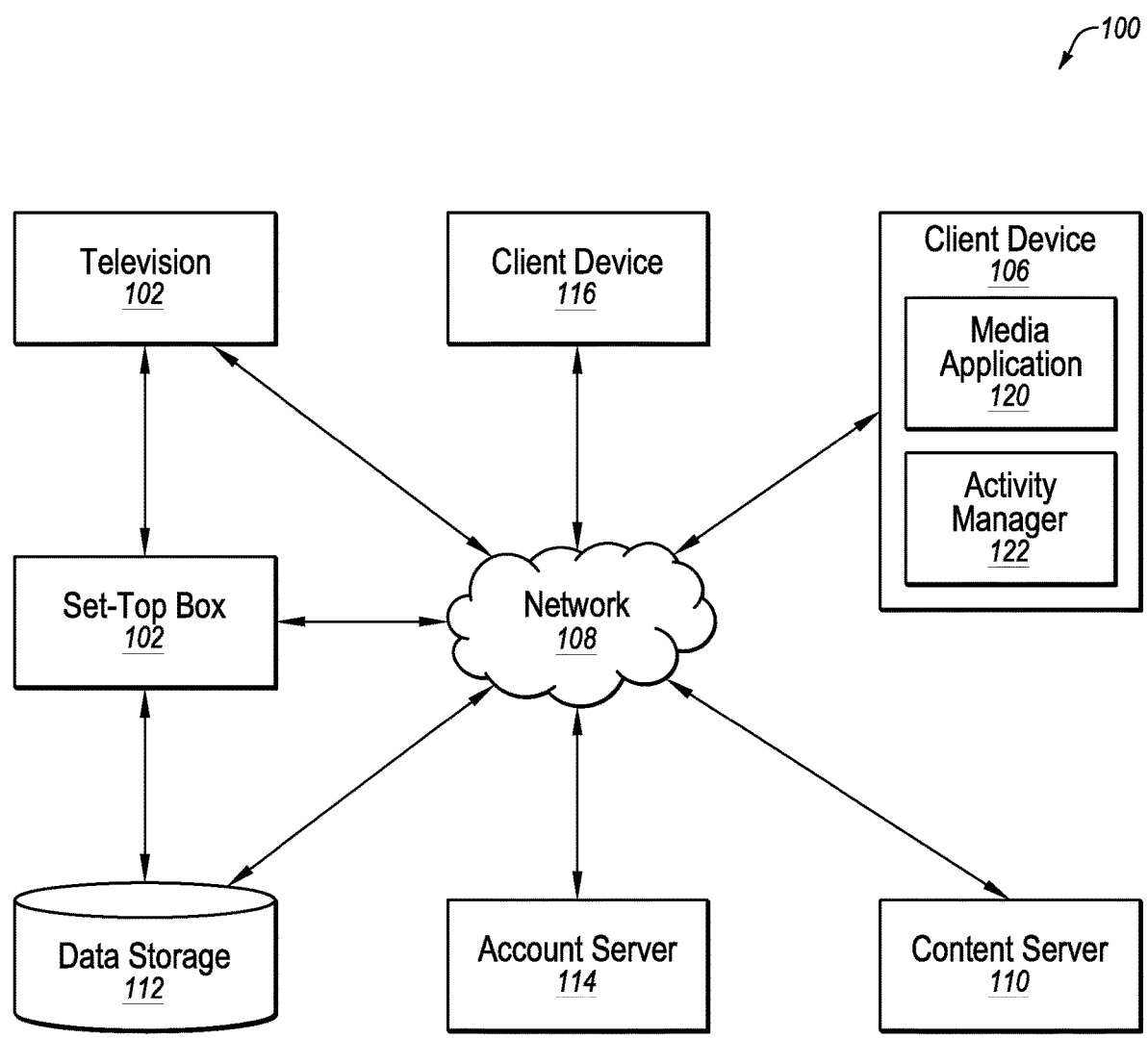
FIG. 1 is a block diagram of an example operating environment in which some embodiments may be implemented.

Client devices may be used to control other devices. Using conventional systems, users may be able to use a client device to initiate control of a secondary device, such as a set-top box, a smart appliance (e.g., thermostat, refrigerator), audio/video system, a gaming system or console, or any other connected device, etc. Under conventional approaches, however, the device to be controlled (i.e., the secondary device) typically does not initiate the control process. Instead, client devices initiate the control by sending commands to the secondary device.

Aspects of the disclosure address these and other shortcomings of conventional systems by providing systems and methods to control the secondary device using a control device. The secondary device may initiate the control process.

An example system may include a memory and one or more processing devices operatively coupled to the memory. The one or more the processing devices may be configured to perform or control performance of operations that may include associating a client device with a secondary device, identifying a triggering event related to an operation of the secondary device, responsive to identifying the triggering event, sending a message to the client device with a request for information related to the operation of the secondary device, the client device having a user interface configured to receive the information, receiving, via a network, the information from the client device, and performing the operation at the secondary device using the information from the client device.

A method includes obtaining an association of a client device with the secondary device. The method further includes identifying a triggering event related to an operation of the secondary device. The method also includes responsive to identifying the triggering event, sending, by the secondary device via a network, a message to the client device with a request for information related to the operation of the secondary device. The client device may have a client device interface configured to present the message and to receive input pertaining to the message. The method includes receiving, via a network, input pertaining to the information from the client device. The method further includes configuring the secondary device to perform the operation at the secondary device using the input received from the client device.

For purposes of illustration and ease in explanation, the present disclosure is described in terms of a television, a set-top box, and a client device. It should be understood that any type of secondary device may be used in place of or in addition to the set-top box. For example, techniques described herein may be used to send and receive messages between any two interconnected devices.

A set-top box may process a signal for display on a television. Typically, control of a set-top box is done using a handheld remote. Using the remote and an on-screen interface on the television, a user may browse TV listings, search for content, and otherwise consume media items. The remote, however, typically provides limited functionality with respect to text entry among other drawbacks. Using a conventional remote, a user may spend a frustrating amount of time using the remote to type text into the on-screen interface. Similar problems may exist with other secondary devices.

To overcome problems associated with prior technology, the set-top box may use messages (e.g., interactive notifications) to initiate and receive information from the client device. Techniques described herein may provide contextual intelligent awareness at the set-top box of when to send information from the set-top box to the client device at an appropriate time. In some examples, when a user encounters a text-entry field at the set-top box, the set-top box may send a message to the client device to provide a virtual keyboard on a display of the client device. The user may then user their client device to enter text and the client device sends the entered text to the set-top box. In this manner, the present disclosure overcomes conventional drawbacks with conventional text-entry on set-top boxes.

The present disclosure also describes the set-top box pushing messages and recommendations for the user to watch and to explore. The client device may present the messages as interactive notifications that the user may interact with or without opening a dedicated media application on the mobile device. The set-top box may use a location of the client device as well as known information about a user to tailor and send contextual messages for the user.

Other technologies, devices, and systems may also benefit from the present disclosure. For example, as "Internet-of-Things" (IoT) becomes more wide-spread, more devices are becoming interconnected with each other. As some IoT devices operate, it may be beneficial to receive assistance from a client device, such as a smart phone. For example, some IoT devices may not have a screen that is large enough to present a full keyboard. These IoT devices may send a message to a client device asking for the input. The client device may receive the input and send it to the IoT device.

FIG. 1 illustrates a block diagram of an example operating environment 100 in which some embodiments may be implemented, arranged in accordance with at least one embodiment described herein. The example operating environment 100 may include a television 102, a set-top box (STB) 104, a client device 106, a network 108, a content server 110, a data storage 112, and an account server 114.

The television 102 may include a device that is configured to present media content via a display device. For ease in explanation, "media content" may refer to video content, audio content, text content, image content, or a combination of at least two types of content. The media content may include an audio component that plays simultaneously with a video component. The media content may include an electronic file that may be executed or loaded using software, firmware, or hardware configured to present the content to a user via the television 102, the STB 104, and/or the client device 106. Media content may also include live-streamed content and media items available on-demand. The television 102 may receive the media content from any source, such as from an over-the-air broadcaster, satellite, cable, a streaming device (e.g., from the client device 106), the content server 110, or from any other source capable of sending media content to the television 102. The media content may include (or be supplemented with) one or more electronic advertisements. The electronic advertisements may advertise any product or service and may be received from any source.

The STB 104 may include a device that is configured to convert video content to analog or digital TV signals. In at least one embodiment, the STB 104 includes a satellite TV receiver or an over-the-air digital-to-analog converter. In at least one other embodiment, the STB 104 may include a media hub that connects to a local network (e.g., network 108) for Internet access and may convert video from online media providers (e.g., Netflix®, Hulu®) into TV signals. The STB 104 may also connect to and receive content from the client device 106. The STB 104 may send analog or digital signals to the television 102 for playback. In at least one embodiment the STB 104 is integrated with the television 102.

The client device 106 may include a computing device which may include, but is not limited to, a desktop computer, a mobile device, a laptop computer, a tablet computer, a mobile phone, a smartphone, a personal digital assistant (PDA), or other suitable computing device. The client device 106 may include any number of applications that may enable a user to perform various tasks. In at least some embodiments, the client device 106 may include an application (e.g., application 120) that may send and receive communications to and from the STB 104. The applications may also include various advertisement and activity tracking components. In at least one embodiment, the client device 106 may include one or more sensors, receivers and/or transceivers (not illustrated) that may be configured to detect activities. The sensors, receivers and/or transceivers may include an audio sensor (e.g., a microphone), a wireless digital signal transceiver (e.g., Wi-Fi, Bluetooth, ZigBee, Z-Wave), a motion sensor (e.g., gyroscope, accelerometer, GPS unit), and the like.

In general, the network 108 may include one or more wide area networks (WANs) and/or local area networks (LANs) that enable the television 102, STB 104, client device 106, content server 110, data storage 112, and account server 114 to communicate with each other. In some embodiments, the network 108 includes the Internet, including a global internetwork formed by logical and physical connections between multiple WANs and/or LANs. Alternately or additionally, the network 108 may include one or more cellular RF networks and/or one or more wired and/or wireless networks such as, but not limited to, 802.xx networks, Bluetooth access points, wireless access points, Long Term Evolution (LTE) or LTE-Advanced networks, IP-based networks, or the like. The network 108 may also include servers that enable one type of network to interface with another type of network.

The example operating environment 100 may include any number of content servers 110. The content server 110 may include one or more computing devices, (such as a rackmount server, a router computer, a server computer, a personal computer, a mainframe computer, a laptop computer, a web server, a proxy server, a desktop computer, etc.), data stores (e.g., hard disks, memories, databases), networks, software components, and/or hardware components. The content server 110 may provide media content (e.g., digital video, streaming video, images, digital music, streaming music, social media information, etc.) to the television 102 and/or the STB 104. To provide media content, for example, the content server 110 may determine whether a user is permitted to access content selected by the user (e.g., whether the user is a subscriber). The content server 110 may also provide advertisements to the television 102 and/or the STB 104.

In at least one embodiment, the data storage 112 may include a memory (e.g., random access memory), a cache, a drive (e.g., a hard drive), a flash drive, a database system, or another type of component or device capable of storing data. The data storage 112 may also include multiple storage components (e.g., multiple drives or multiple databases) that may span multiple computing devices (e.g., multiple server computers). The data storage 112 may store client device information, client device association information, information pertaining to one or more client devices being associated with one or more STBs, group information that includes one or more client devices that are associated with one or more STBs, one or more user profiles, one or more user accounts, one or more show schedules associated with one or more user accounts, recordings set by a user account, user watch histories, social activities (e.g., a like, a share), consumer activities (e.g., a purchase, a save, a watch, a listen), etc. Although each of the STB 104 and data storage 112 are depicted in FIG. 1 as single, disparate components, these components may be implemented together in a single device or networked in various combinations of multiple different devices that operate together.

The example operating environment 100 may include any number of account servers 114. The account server 114 may include one or more computing devices, (such as a rackmount server, a router computer, a server computer, a personal computer, a mainframe computer, a laptop computer, a web server, a proxy server, a desktop computer, etc.), data stores (e.g., hard disks, memories, databases), networks, software components, and/or hardware components. The account server 114 may provide account information to the STB 104. In at least some embodiments, the account server 114 may cause the account information to be stored in the data storage 112 or in another data storage. The account information may include one or more usernames, one or more subscription levels, one or more user accounts, one or more devices associated with each user account, location information pertaining to the one or more user accounts, etc. The STB 104 may request the account information from the account server 114. Additionally or alternatively, the account server 114 may push the account information to the STB 104.

The client device 106 may include a media application 120 that allows an end user to interact with the STB 104 via the client device 106. The media application 120 may receive messages from the STB 104. In response to the received messages, the media application 120 may cause various user interface tools to be displayed on a display device at the client device 106. In at least some embodiments, the user interface tools may be configured to provide at least one interactive notification. The user interface tools may include a tool configured to receive input via the client device 106. For example, the STB 104 may send an interactive notification to the client device 106 that includes an instruction for the client device 106 to present an on-screen or virtual keyboard. The client device 106 may cause the virtual keyboard to be presented on the display device. The display device may include touch-sensitive features (e.g., a capacitive sensing system) configured to receive touch input from a user. The display device may, for example, may receive keyboard input from the user. The client device 106 may send the keyboard input to the STB 104. The STB 104 may use the keyboard input as input for a STB function, such as those illustrated in FIGS. 4, 5, 6, 7, and 10. For example, the STB function may include a search for various media items. Using the keyboard input received from the client device 106, the STB 104 may initiate a query. The STB 104 may, for example, send the query to the content server 110. The content server 110 may send query results to the STB 104 and the STB 104 may cause the query results to be presented on the television 102. In this manner, the client device 106 may be used to receive input on behalf of the STB 104. The user interface tools may include any tool configured to receive any type of input via the client device 106. For example, the user interface tool may be configured to present different voting options (e.g., a favorite singer in a singing competition TV show) via the client device 106. The user interface tool may receive a selection of one of the voting options and the client device may send the selection of the voting option to a voting server (which may include the content server 110 or any other server). In another example, the user interface tool may be configured to present information for an item that is available for purchase. The item may include any item, such as any physical good, any virtual good, any electronic good, any media item, etc. The item that is available for purchase, for example, may include an item that is related to a media item. For example, a character in a movie may be wearing a particular hat in a movie that is currently playing. The user interface tools may present information related to the particular hat, including price, color options, size options, delivery options, etc. The user interface tools may receive input indicative of an intent of the user to purchase the item. The client device 106 may send a purchase request to a server that relates to the input indicative of the intent of the user to purchase the item.

In at least some embodiments, the media application 120 may be used to select and/or view content on the television 102 via the STB 104. For example, the media application 120 may be a web browser that may present a list of media content items to the end user. As a web browser, the media application 120 may also access, retrieve, present, and/or navigate content (e.g., web pages such as Hyper Text Markup Language (HTML) pages, digital media items, etc.) served by a web server. The media application 120 may render, display, and/or present the list content to the end user. The media application 120 may also provide an embedded media player (e.g., a Flash® player or an HTML5 player) that is embedded in a web page (e.g., a web page that may provide information about a product sold by an online merchant). In another example, the media application 120 may be a standalone application (e.g., a mobile application or mobile app) that allows users to consume digital media items (e.g., digital videos, digital images, electronic books, websites, etc.) and send various input to the STB 104. The media application 120 may be provided to the client device 106 by the content server 110 or via an application store. The media application 120 may enable the client device 106 to receive messages from the STB 104. In at least some embodiments, when the media application 120 is installed on the client device 106, the STB 104 may send messages to the client device 106. The client device 106 may present message as notifications, whether or not the media application 120 is running in the foreground, background, or disabled, etc. In at least some embodiments, in addition to having the media application 120 installed on the client device 106, the STB 104 may send messages to the client device 106 while the client device 106 and the STB 104 are both on a same network. Additionally or alternatively, the STB 104 may send a first type of messages to the client device 106 while the client device 106 and the STB 104 are both on a same network and a second type of messages to the client device 106 while the client device 106 and the STB 104 are not on a same network.

Initial Setup and Configuration

In at least some embodiments, a user may create a user account with a content provider, such as a cable TV provider. In at least some embodiments, the account server 114 is associated with the content provider. To create the account, the user may, for example, navigate to a website and provide signup information to the content provider. In at least some embodiments, during a user account creation process, the user may identify one or more client devices to register with the service provider. The service provider may register such devices including a device identifier for each of the client devices with the user account. In at least some embodiments, the service provider may register a unique identifier (e.g., UUID) of each client device with the user account. Additionally or alternatively, the user may provide an identifier. For example, a father may register his mobile phone with a description "Dad's phone," his wife's mobile phone with a description "Mom's phone," and a child's mobile device with a description "Child's device." The account server 114 may store the identifiers of the various client devices in association with the user account in the data storage 112. The content provider may also assign a STB to the user account and register an identifier for the STB in association with the user account. A record of the user account may include one or more STBs associated with the user account and one or more client devices associated with the user account. In at least some embodiments, one or more options or account preferences may be available to the user, such as an option to only send notifications or messages of a particular client device, device type, etc. In at least some embodiments, an option or preference may include a setting to select one or more client devices that may or may not receive notifications. For example, a user may set the "Dad's phone" and "Mom's phone" to receive notifications and the "Child's device" to not receive notifications.

In at least some embodiments, part of the user account creation process includes downloading the media application 120 to the client device 106. The media application 120 may present a registration interface that may be configured to receive various information, such as user information, STB information, etc. Using the media application 120, the user can initiate the user account creation process and associate the STB 104 with the client device 106. For example, using the media application 120, the user can input an identifier of the STB 104 (e.g., a MAC address or other identifier of the STB). Either the STB 104 or the client device 106, or both, may send a validation message to the account server 114, which may be associated with the content provider to confirm association of the STB 104 and the client device 106.

In at least some embodiments, the STB 104 may be initialized for use by the media application 120. For example, the STB 104 may be Wi-Fi-enabled and the media application 120 may be used to provide network credentials to the STB 104, as further described in conjunction with FIG. 4. The STB 104 may also send interactive notifications to the client device 106 and/or to the media application 120 to configure the STB 104. For example, the STB 104 may send a message to the client device 106 to present a user interface tool to receive configuration details for the STB 104. The client device 106 may receive the configuration details for the STB 104 via the user interface tool. The client device 106 may send the configuration details for the STB 104 to the STB 104 or to any other device that may apply the configuration details for the STB 104 to the STB 104. The media application 120 may also be used to adjust any of the STB 104 configuration or settings, such as language selection, picture quality, resolution, etc. using the techniques described.

STB and Client Device in Operation

In operation, the STB 104 may push a message to the client device 106. The message may include a request for input. For example, the message may include a request for alphanumeric characters, haptic input, audible input, or any other type of input that may be received by the client device 106. In at least some embodiments, the message may include a request for a particular type of input from the client device 106 and/or an input method. For example, the message from the STB 104 to the client device 106 may include a request for a username and a password. The message may also include an instruction to retrieve the username via a text box and to retrieve the password from a text box where the characters of the password may be masked or disguised when they are provided to the client device 106. Any type of input method may be used, such as a keyboard, numeric keypad, on-screen gesture, off-screen gesture, etc.

In an example embodiment, the STB 104 may receive an input. For example, a user may use a STB remote to navigate through various graphical interfaces of the STB 104. The STB remote may include a button that, when pressed, sends a request to the STB 104 to use the client device 106 to provide the input. Additionally or alternatively, the user's navigation using the STB remote may arrive at a STB input field in a particular graphical interface of the STB 104. The STB 104 may determine whether the STB input field can be controlled or supplemented by a client device. The STB 104 may identify available client devices. In at least some embodiments, the STB 104 may check the network 108 for available client devices that are also connected to the network 108. Additionally or alternatively, the STB 104 may check a user account for available client devices. In at least some embodiments, the STB 104 checks a local storage for devices associated with the user account. The STB 104 may query the account server 114 for devices associated with the user account. If a client device is identified (e.g., client device 106), the STB 104 may determine a communication mechanism by which to contact the client device 106. The communication mechanism may include, for example, the network 108 or another network. The STB 104 may then send a message to the client device 106 using the communication mechanism. The message may include an instruction for the client device 106 to open a user interface on the client device that includes a client input field that corresponds to the STB input field at the STB interface. For example, when the STB input field relates to alphanumeric characters, the client input field may include a keyboard. The message may include an instruction for the client device 106 to present a virtual keyboard on a display of the client device 106. The user may provide user input to the client device 106 via the client input field (e.g., by typing on the virtual keyboard). The client device 106 may send the user input to the STB 104. The STB 104 may use the received user input to perform an operation, such as to initiate a search for one or more media items using the received user input as keywords for the search in the STB input field.

The message may include different instructions based on a type of STB input field and/or a number of STB input fields. For example, the message may indicate that a STB input field is a text box, a username field, a password field, etc. and that the client device 106 is to present a similar input field as the STB input field. Further, the message may indicate multiple input fields. For example, the message may indicate that the client device is to provide both a username field and a password field to receive user input. The client device 106 may provide functionality for the user to toggle between two or more STB input fields without further interaction with the STB 104.

In at least some embodiments, the STB 104 may send the message to the client device 106 in response to a triggering event. As in the above example, the triggering event may include the user's navigation that arrives at the STB input field in a graphical interface of the STB 104. A selection of or a navigation to a text field may be a triggering event. Other triggering events may include a time, a user status, or a client device location, among others.

A time-based triggering event, for example, may include a scheduled time, such as a calendared time when a particular show begins. For example, the message may include a reminder that the show is about to begin and an instruction for the client device 106 to provide an option, via a user interface at the client device, to power on the STB 104 and/or to tune a channel of the STB 104 to a channel that is scheduled to broadcast the show.

A user status-based triggering event, for example, may be based on one or more past or current user activities and/or user characteristics. For example, the user status may include the user watching a show on the television 102 and then an advertisement may begin to play. The playing advertisement may, for example, be for a different show. In response to the playing advertisement (the user status-based triggering event), the STB 104 may send a message to the client device that includes an instruction for the client device 106 to present an interactive notification for the user to set a recording for the different show. In another example, the advertisement may be for a new car. The message may include an instruction for the client device 106 to present more information about the new car, including an option to sign up to test drive the new car at a local dealership. In another example, the user may be watching a show and a product placement advertisement appears in the show. The message may include an instruction for the client device 106 to provide more information about the product in the product placement advertisement, including price, description, how to buy, and a hyperlink to a store that sells the product. In this manner, while a commercial is airing on the television 102, the user may receive a notification that pops up on the client device 106 to be able to act on that commercial.

In another example of a user status-based triggering event, the user may be watching a show on the television 102 and may be nearing the end of the show. At a predetermined time before the end of the show (e.g., 30 seconds before), the STB 104 may send the message to the client device 106 with an instruction for the client device 106 to present information for a different show to watch next. The client device 106 can also present an interface tool that the user can activate to begin playback of the different show, which may include changing a channel to a different program. In an example, the user may be watching a baseball game. Based on the user watching the baseball game, and based on the user's past activities of frequently watching baseball games (and based on the user's subscription to a baseball fan content package), the STB 104 may determine that the user may desire to continue to watch more baseball after the current game ends. Before the end of the current game, the STB 104 may send a message to the client device 106 with an instruction to present information for one or more other baseball games that may be currently airing. The client device 106 may present one or more interface tools that can be activated by the user to select one of the one or more other baseball games to watch. The client device 106 may send the user selection to the STB 104 and the STB 104 can change the channel to the other selected baseball game.

In another example of a user status-based triggering event, the user may be watching a particular show. The STB 104 may identify one or more social contacts of the user, such as by querying a social network service or in the data storage 112. The STB 104 may identify a social contact from among the one or more social contacts of the user that is also watching the same show as the user such as by querying the content server 110 or the account server 114 for a current watch status of social contacts of the user. The STB 104 may send a message to the client device 106 with an instruction to present the message to the user, where the message indicates that the social contact of the user is also watching the show. The STB 104 can also instruct the client device 106 to present a notification that asks the user if they would like to communicate with the social contact. The message may also include contact information for the social contact. The client device 106 may present the contact information for the social contact in a display. The user may select the contact information to initiate a conversation with the social contact.

In an example, interactive notifications may be used at various points and in response to various activities. For example, the triggering event may include a request to log into the STB 104. When the user is attempting to log into the STB 104, the STB 104 may send a message to the client device 106 to present a user interface tool configured to receive the user's login details for the STB 104. A triggering event may also include a request to log into a user account. When the user is attempting to log into an account, such as via the STB 104, the STB 104 may send a message to the client device 106 to present a user interface tool configured to receive the user's login details for the user account. A triggering event may also include an activation of a button on a STB remote. Responsive to the button on the STB being pressed, the STB may send input to the STB 104 indicative that the button has been pressed. The STB 104 may then send a message (that may include an interactive notification) to one or more client devices that are associated with the STB 104 or with an account that is currently logged into the STB 104.

Interactive notifications may be sent to the client devices 106, 116 using different technologies and protocols. For example, the interactive notifications may be sent using an open standard application layer protocol for message-oriented middleware, such as Advanced Message Queuing Protocol (AMQP). In another example, the interactive notifications may be sent using a message queue system or message broker. The interactive notifications may be queued on a central node or server before the interactive notifications are sent to the client devices. In at least one embodiment, the central node or server may provide routing, load balancing, persistent message queuing, negative acknowledgement (NACK), re-queue, delay and schedule services when providing the interactive notifications. In at least one embodiment, the interactive notifications may be sent using a cross-platform runtime environment, such as Node.js. The cross-platform runtime environment may improve throughput and scalability in various applications, such as for Web apps. In at least one embodiment, the interactive notifications may be sent as server-sent events (SSE). When using SSE, all client devices may connect to the server with a same base URL and a same port. SSE may include single direction messaging where the interactive notifications may be sent to the client devices and not to the server. In at least one embodiment, the interactive notifications are sent on a subscription basis, where client devices may subscribe to messages for a particular service or server. The service or server may send the interactive notifications to the client devices that have subscribed.

In at least one embodiment, the client device 106 may include a text-to-speech converter that may convert text-based messages to an audio message. The client device 106 may audibly play the audio message. The client device 106 may receive any kind of input in response to audibly playing the audio message. In at least one embodiment, the input may include audio input that may be received by a microphone at the client device 106. The client device 106 may also include a speech-to-text converter that may convert the audio input to electronic input, which may include alpha-numeric input. In this manner, a user may speak the audible input and the client may translate the audible input into electronic input that may be used for any action at the STB 104.

Client Device Presence Detection

The STB 104 may use presence detection when sending messages to one or more client devices. When performing presence detection, the STB 104 may determine a location of at least one of the client devices. The location of a client device may include an approximate location. The location of a particular client device may be a location of the particular client device relative to locations of other client devices.

To detect the presence of the client device 106, the STB 104 may use one or more location detection techniques, such as Wi-Fi, Bluetooth®, global positioning system (GPS), tremors in a user holding the client device, voice far-field, among other techniques.

In some example embodiments, the STB 104 may determine a location of the client device 106 based on identifying a Wi-Fi network to which the client device 106 is connected. The STB 104 may also determine the location of the client device 106 based on a router or access point to which the client device 106 is connected. In at least some embodiments, the client device 106 may inherit a location from a network to which it is connected. For example, a network device (e.g., a modem, router) may be associated with a particular external internet protocol (IP) address that is also associated with a geographic location. The client device 106 may inherit the geographic location associated with the IP address of the network device.

In some example embodiments, the STB 104 may use triangulation to determine the location of the client device 106. For example, the STB 104 may identify multiple points (e.g., three points or more points) of low-energy Bluetooth that allows the STB 104 to triangulate or pinpoint where the client device 106 is located within a room in relation to the STB 104.

In some example embodiments, the STB 104 may use tremor detection to determine the location of the client device 106. A person may have a unique hand tremor pattern when they pick up a remote or client device 106. The remote or client device 106 may send a detected tremor pattern to the STB 104. The STB 104 may use the detected tremor pattern to determine who is actually in control of the remote or client device 106 at that time. In at least some embodiments, the STB 104 may record tremor patterns over time in association with various activities, such as user registration, login, media item selection, etc. The STB 104 may generate a tremor pattern profile, which may include using machine-learning techniques, and may associate that pattern with a particular user. The STB 104 may store the tremor pattern profile in association with a user account of the particular user.

In some example embodiments, the STB 104 may use far-field voice techniques to determine the location of the client device 106. For example, the STB 104 may periodically use far-field voice techniques to detect speech from a user that is near the STB 104. In at least some embodiments, a remote for the STB 104 may also turn on far-field voice at certain intervals to identify a voice. Identification of a particular voice may indicate that a user is near the STB 104 and may be watching the television 102. In at least some embodiments, the STB 104 may check the detected voice against a database of voices to determine a particular user. Responsive to an identification of a particular user, the STB 104 may identify a user account for the user and/or one or more client devices that are associated with the particular user or user account. For example, the STB 104 may determine, based on the detected voice of the user, that the client device 106 is associated with the user. The STB 104 may send messages to the client device 106 that may be directed or tailored to the user.

Presence may be determined at different levels. Four levels are described but any number of levels may be used. A first level may be described as "associated with the account." At this level, one or more users may be associated with a single account with a content provider. The one or more users may be associated with one or more STB devices (e.g., the STB 104) on the account. Each of the one or more users may have their own data within a personal profile. Each of the one or more users may have their own client device that is associated with the single account with the content provider. The STB 104 may send message to each of these client devices.

A second level may be referred to as a "location" level. The second level may build on the first level. Under this second level, a particular user may be at home (or at an alternate location) where his devices are connected, or are regularly used. A user may be deemed "at home" when the client device of the user is connected to his home Wi-Fi network. For example, detection of one or more of the client devices associated with the single account connected to the same network as the STB 104 may indicate "presence" at the second level. Additionally or alternately, a geo-fence (or any other technology) which indicates particular behaviors which typically happen within that realm, such as the user watching short-form content on his commute to and from work.

A third level may be indicative of an actual awareness of the user being in front of the television 102 and/or STB 104. The third level may build on the first level and/or the second level. This type of presence detection may be performed by far-field voice techniques, as described above, a STB camera, infrared detection techniques, facial recognition techniques, etc. to actually detect the user being proximate to the television 102 and/or STB 104. In another embodiment, the television 102 may present content that includes a watermarked soundbite, such as a sound that is outside of the normal hearing range of a human. The client device 106 may detect the watermarked soundbite and may send a message to the STB 104 indicative of the client device's detection of the watermarked soundbite. The STB 104 may use a receipt of this message to determine actual presence of the client device 106.

A fourth level of presence detection may be referred to as "direct intent." For this level, a user may have explicitly indicated that he wants to take an action on the STB 104 using the client device 106.

In addition, the STB 104 may use presence detection to determine a type of message to send to the client device 106. For example, the STB 104 may determine an identity of the user, recommendation data for the user, location data of the client device associated with the user, a proximity of the client device 106 to the STB 104, current activity on the STB 104, among other information to send a message to the client device 106. For example, the STB 104 may know the identity of the user, that the user likes luxury cars, that the user has recently searched the Internet for luxury cars, that the STB 104 is currently playing a show that includes fast cars and that the client device 106 is proximate to the STB 104. The STB 104 may use this information to send a targeted message (e.g., a car advertisement) to the client device 106.

In at least one embodiment, the STB 104 may detect that the user is in an area of interest. The area of interest, for example, may include a store, a shopping mall, a sport facility, or any other area of interest. The STB 104 may, for example, determine that the client device 106 has connected to a wireless network associated with a particular store. The STB 104 may in turn send a message to the client device 106. The message may, for example, include a coupon, a discount code, or another other information pertaining to the store.

In another example, the proximity of the client device 106 to the STB 104 may affect the messages that the STB 104 sends to the client device 106. For example, the STB 104 may send information about what is current and playing in the set-top box when the client device 106 is nearby. When the client device 106 is not close to the STB 104 or connected to a different network than the STB 104, the STB 104 may send other information, such as promotional information. The STB 104 may also change the context of the promotional information based on a user's location or proximity to the STB 104

The client device 106 may include an activity manager 122 to identify one or more activities of the user and/or the client device 106. Example activities may include being exposed to an advertisement, a movement (e.g., movement of a physical location or position), a consumer activity (e.g., browsing webpages, making a purchase), a disinterested activity (e.g., an activity that may indicate a low level of user interest in an advertisement), etc.

In an example pertaining to the activity manager 122 detecting a movement activity, the example operating environment 100 may include an area. The area may be geographically defined, such as by a building, a room within the building, etc. In at least one embodiment, the area may be defined by a video content-based characteristic, a characteristic of the television 102 and/or a sensor of the client device 106. For example, the area may be defined by a current volume level of video content that is playing on the television 102, as detected by a microphone of the client device 106. The client device 106 may move in and out of the area. The activity manager 122 may determine when the client device 106 moves in and out of the area. For example, when the client device 106 moves far enough away from the television 102 such that the microphone no longer detects sound from the television 102 (or the detected sound falls below a sound threshold), then the activity manager 122 may determine that the client device 106 may have moved outside of the area. In at least one embodiment, the activity manager 122 may use a detected volume level to determine a user distance from the television 102. The activity manager 122 may send information about movements of the client device 106 inside and outside of the area to the STB 104.

In another example, the client device 106 may connect to the STB 104 via a wireless link, such as Bluetooth®. The wireless link may be disconnected when the client device 106 moves further than a threshold distance away from the STB 104. In at least one embodiment, a wireless radio may be configurable to cover a user-selected distance. The STB 104 may detect that the connection to the client device 106 has been lost in response to the connection being disconnected.

In at least one embodiment, the example operating environment 100 may include multiple client devices, for example another client device 116. The STB 104 may detect client devices (e.g., client device 106 and client device 116) that may be in or near the area. The STB 104 may detect a first user profile associated with the client device 106 and a second user profile that is associated with the client device 116. For example, the STB 104 may detect a device identifier (e.g., MAC address, UUID) for each client device and then determine that a first UUID of the client device 106 is associated with the first user profile and a second UUID of the client device 116 is associated with the second user profile. The STB 104 may send messages to the client device 106 based on the first user profile. The STB 104 may send messages to the client device 106 based on the second user profile. In at least one embodiment, the client device 116 may include any connected device, including an appliance, an IoT device, etc. The STB 104 may detect an event at the client device 116 and may send a message to the client device 106 based on the event at the client device 116. For example, the client device 116 may include a doorbell. In response to detecting a doorbell ring, the STB 104 may send a message to the client device 106 that may include a notification that the doorbell has rung and/or an option to pause, stop, or mute playback of a currently playing media item, etc.

The STB 104 may also perform presence detection for multiple client devices. The STB 104 may send messages to each of the client devices. For example, "Dad's phone," "Mom's phone," and "Child's device" are each detected by the STB 104. The STB 104 may send messages to each of these client devices.

In at least some embodiments, the STB 104 may send messages to fewer than all of the detected client devices. The STB 104 may use presence detection to determine which of the client devices to send messages to. For example, the STB 104 may determine which of the client devices is closest to the STB 104 and send messages only to that client device.

In at least some embodiments, the STB 104 may determine that "Dad's phone" is the primary client device on a single account and the STB 104 may select "Dad's phone" as the recipient of the STB messages.

In at least one embodiment, the STB 104 may send messages according to a control policy, which may include a parental control policy. The policy may, for example, block specific elements of a media item using parental control (rather than unnecessarily blocking an entire media item). For example, certain restrictions may be placed on a media item. When the STB 104 receives a request to play a media item that includes restricted content, the STB 104 may send a message to the client device 106. The message may include, for example, a notification that a next scene or a next section of the media item contains restricted content. The STB 104 may, for example, automatically pause the media item before reaching the restricted content and send a message to warn the user that the next scene or next section contains restricted content. The message may include an interactive notification that includes at least one user interface tool. The user interface tool may include a selection option that the user can select to continue watching (or watch later), skip this specific scene/section, or stop watching the content, among other options. The user interface tool may include selectable options to censor explicit words from the audio, subtitles and content description (metadata), request and present only "child friendly" advertisements, etc.

The STB 104 may send a message to a first client device (e.g., client device 116) to unlock content on or requested by a second client device (e.g., client device 106). In at least one embodiment, the certain restrictions on media items may apply to some or all of the client devices 106, 116. For example, a "Child's device" 106 may send a request to the STB 104 to play content that includes restricted content. The STB 104 may determine that the "Child's device" 106 is not authorized to view or request playback of the requested content (e.g., on the client device 106 or the television 102). The STB 104 may send a message to the "Dad's phone" 116 to notify the Dad that the Child has attempted to play restricted content. The message may also include an option for the Dad to permit the child to consume the restricted content on the client device 106 or the television 102.

Dad's phone 116 may provide a user interface tool that is configured to receive input to permit the Child's device 106 to view the restricted content. In at least one embodiment, the user interface tool may provide additional information, such as a preview of the restricted content, information about who else may have watched or who is watching the restricted content, a past viewing history of the child (e.g., content items, genres, viewing time), trending, recommendations, or other social information about the restricted content, etc. Dad's phone 116 may send the input to the STB 104. The STB 104 may authorize the Child's device 106 or the television 102 to present the restricted content in response to receiving the input to permit the Child's device 106 to view the restricted content from Dad's phone 116. In at least one embodiment, the input may include an approval, a selection of an option to add the content to a customized "allowed" playlist, a disapproval, a selection of an option to add the content to a customized "blocked" playlist), an option to select alternative content to view that may be sent to the Child's device 106 and/or the television 102.

In another example, the STB 104 may determine how long it has been since the media application 120 was opened on the client device 106. In at least some embodiments, the STB 104 may request that the client device 106 send this information. In at least some embodiments, the client device 106 may send this information to the STB 104 without receiving a request for the information from the STB 104. For multiple detected client devices, the STB 104 may determine which client device has recently opened the media application 120. For example, if a first client device has the media application 120 running and the other devices have not had it activated in a few days, then it is more likely that the first client device is associated with a person who is currently consuming content. The STB 104 may select the first client device and send messages to the first client device.

In some example embodiments, the STB 104 may determine a presence detection score for the client device. The presence detection score may be indicative of how close to the STB 104 the client device 106 may be. The presence detection score may also account for an identity of the user associated with the client device 106. The presence detection score may indicate that a client device 106 (and a user of the client device 106) is likely to be near the STB 104 and that the user of the client device 106 is likely to be sitting down and watching content on the television 102 or interacting with the client device 106. The presence detection score may be used to select one or more client devices from a group of available client devices. For example, the STB 104 may determine a score for each of the client devices 106, 114 and may select one of the client devices based on the scores of the client devices 106, 114.

Modifications, additions, or omissions may be made to the example operating environment 100 without departing from the scope of the present disclosure. Specifically, embodiments of the example operating environment 100 are depicted in FIG. 1 as including one television 102, one set-top box 104, one network 108, one content server 110, one data storage 112, and one account server 114. However, the present disclosure applies to an example operating environment 100 including one or more televisions 102, one or more set-top boxes 104, one or more networks 108, one or more servers 110, one or more data storages 112, or any combination thereof.

Moreover, the separation of various components in the embodiments described herein is not meant to indicate that the separation occurs in all embodiments. Additionally, it may be understood with the benefit of this disclosure that the described components may be integrated together in a single component or separated into multiple components.

In situations in which the systems discussed here collect personal information about users, or may make use of personal information, the users may be provided with an opportunity to control whether the systems discussed collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the systems discussed.

Figure 2A:
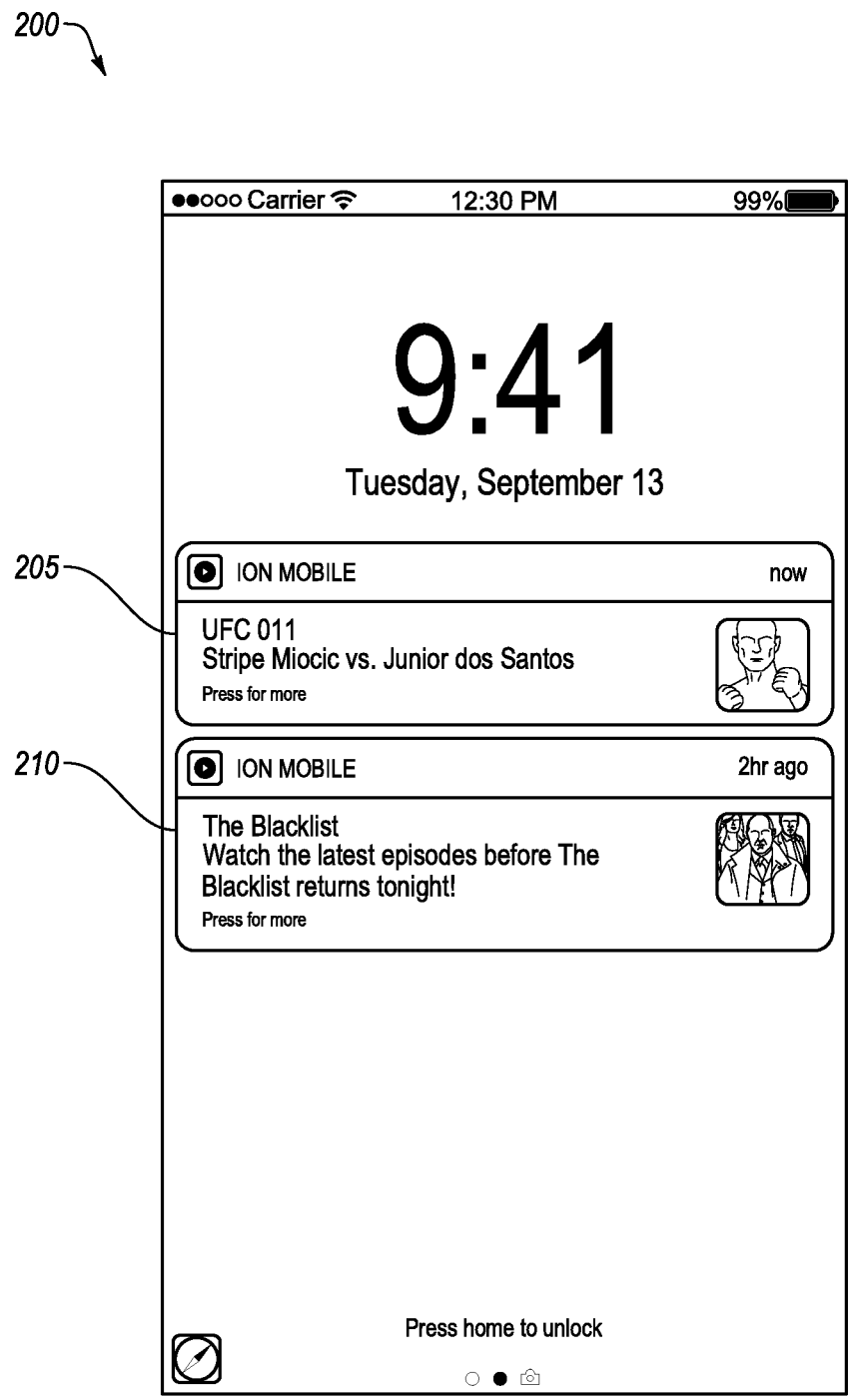
FIG. 2A illustrates an example client graphical user interface (GUI) with at least one message received from a secondary device.

FIG. 2A illustrates an example client graphical user interface (GUI) 200 with at least one message received from a secondary device. In response to an action of the secondary device (e.g., the STB 104 of FIG. 1) or an action by a user (e g, making a selection, entering a text box), an STB can send a message (e.g., a notification) to a client device (e.g., the client device 106 of FIG. 1). As illustrated, GUI 200 illustrates two notifications 205, 210 on the client device on a lock screen.

Figure 2B:
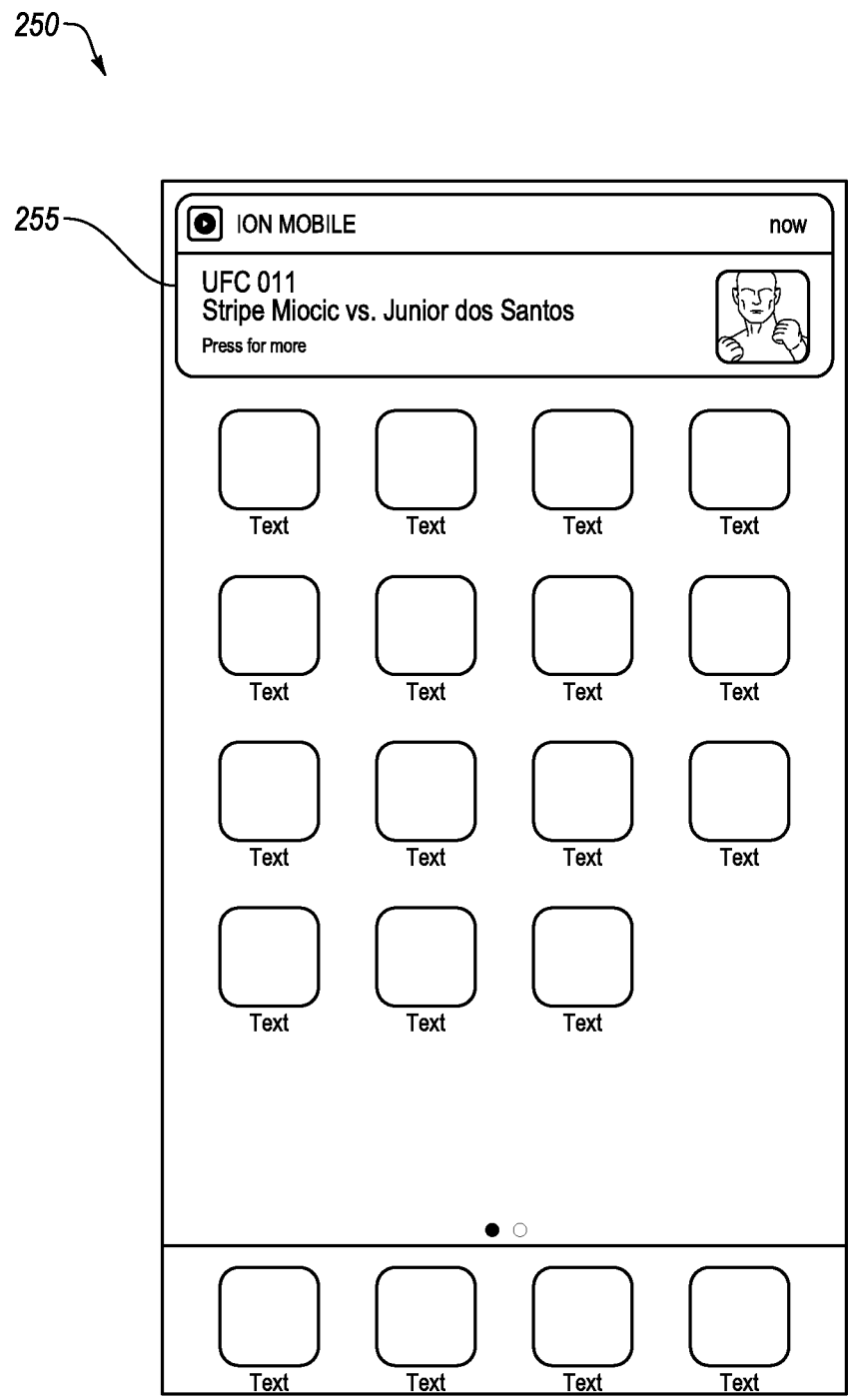
FIG. 2B illustrates a GUI with a notification on the client device when the client device is in use.

A messages may include an application name, a small icon, a small image and a short message. A message can be used when both a phone is locked and in use. FIG. 2B illustrates a GUI 250 with a notification 255 on the client device when the client device is in use.

The secondary device may send a message to the client device at any time, such as when a content provider pushes notifications about special events or promotions, when a content provider generates various recommendation notifications (e.g., a live sporting event), and when a user has previously set a show reminder, among other scenarios. In at least one embodiment, a user swipe to the right may dismiss the notification and a swipe to the left may cause a launch of a media card.

Figure 3:
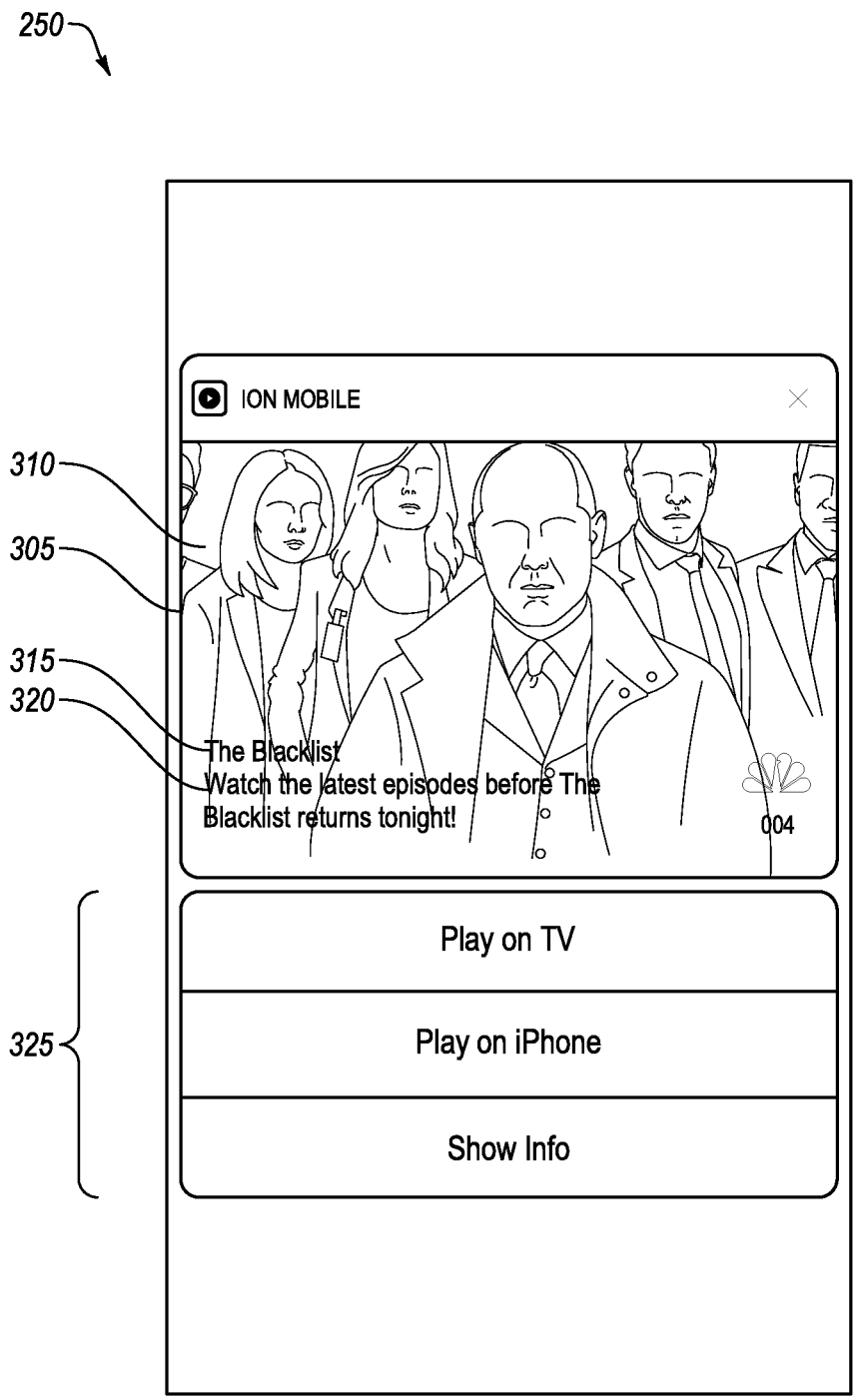
FIG. 3 illustrates an example GUI with an action sheet for a media item.

FIG. 3 illustrates an example GUI 300 with an action sheet 305 for a media item. The action sheet may, for example, include a show image 310, a show title 315, one or more lines of show description or promotional message from the notification 320, action options 325, a network logo, and a channel number, etc. In at least one embodiment, a black gradient mask may be applied over the show image 310 to enhance legibility of text information.

Some client devices may be force-click enabled, which may allow a user to use force to activate different options in a GUI. When a notification is force-clicked, the action sheet may be revealed. An example behavior in this state may include a force-click to get options to: "Play on TV" (which may be enabled by the STB if the client device and STB are near each other), "Play on Phone," and "Show Info," which may launch a media card. Another example behavior in this state may include a force-click to get options to: "Play on Phone" (such as when the STB if off or when the client device is not near the STB) and "Show Info." A user tapping on "Play on TV" may send a message to the STB to cause the show to play on a television (e.g., the television 102 of FIG. 1). A user tapping on "Show Info" may launch into that item's media card on the client device or on the television via the STB.

Figure 4:
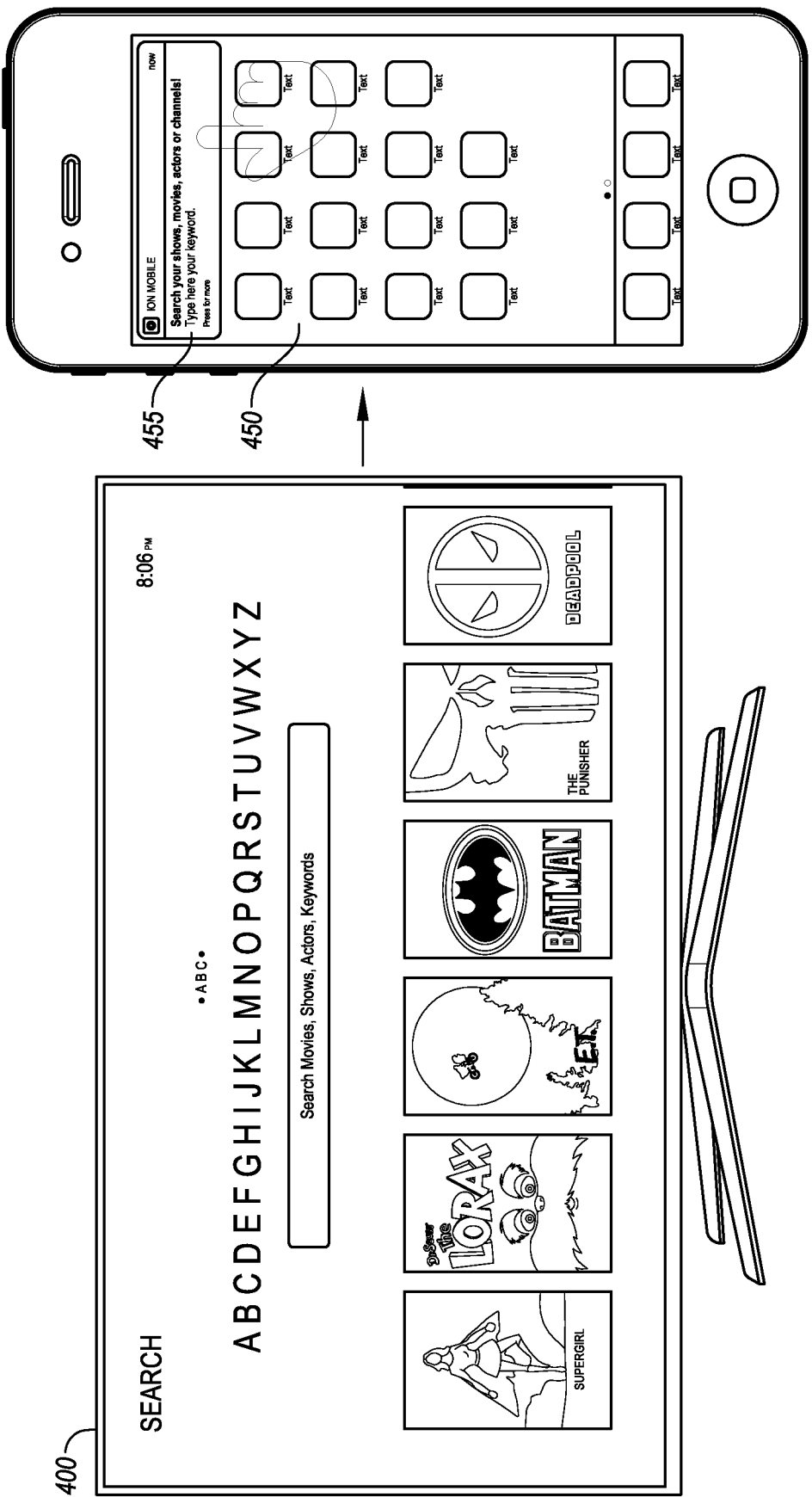
FIG. 4 illustrates an example set-top box search GUI and an example client GUI.

FIG. 4 illustrates an example STB search GUI 400 and an example client GUI 450. When the STB and client device are near, such as when the STB and client device are connected to the same network, a user can use a mobile application on the client device as an input device for the STB.

In an example, a user may be using a STB remote to navigate through the STB GUI. The user may navigate to a STB search GUI 400. In response to navigating to the STB search GUI 400, the STB may send a message to the client device indicative of the current state of the STB being at the STB search GUI 400. The message may also include an instruction for the client device to present a client search GUI, which may include one or more input boxes and/or a virtual keyboard.

The client device may display some or all of the message in a notification 455. The notification 455 may include text to let the user know that they may control the STB and/or provide input to the STB via the client device. Upon activation of the notification 455, the client device may present a virtual keyboard.

Figure 5:
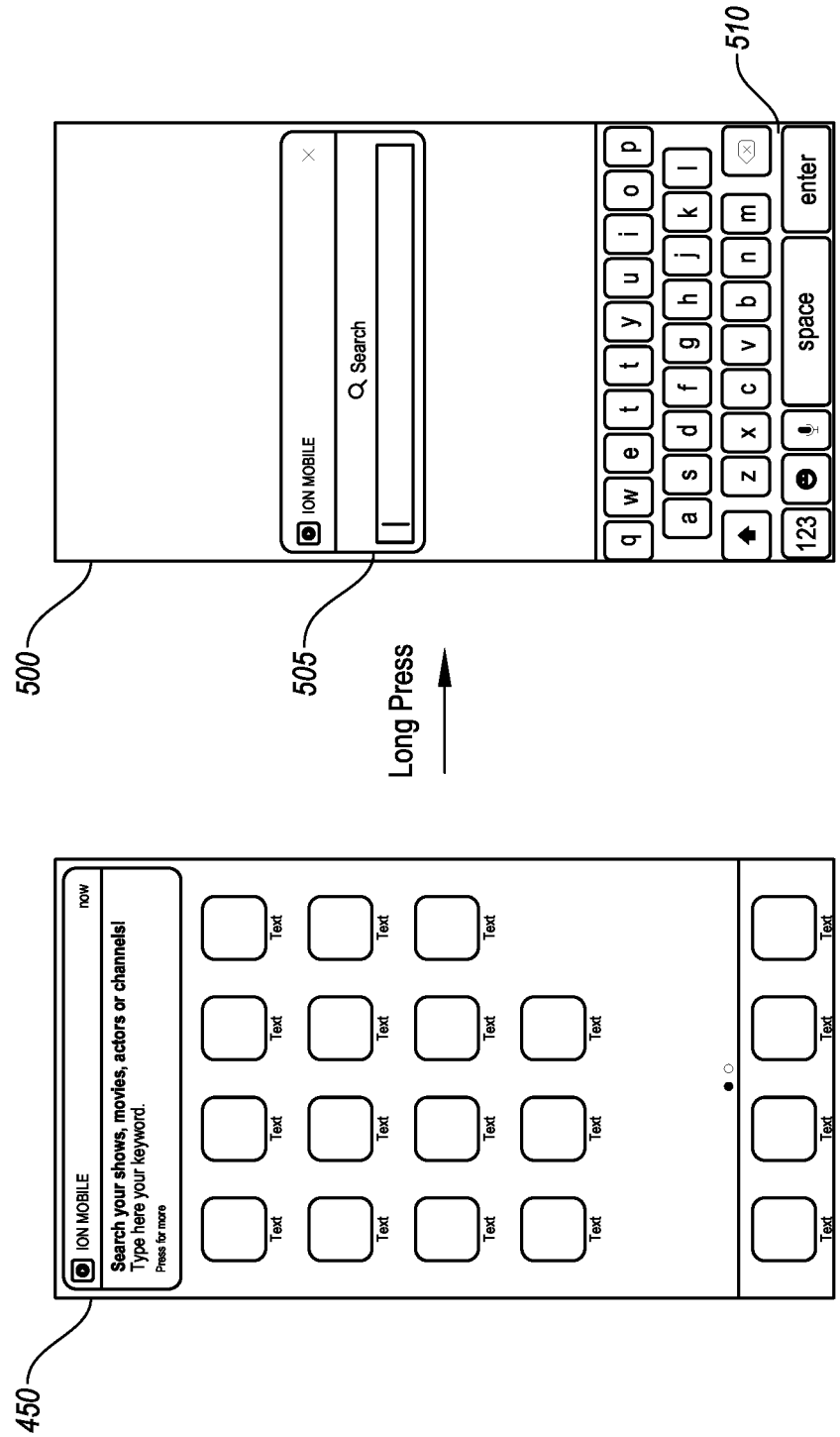
FIG. 5 illustrates the example client GUI of FIG. 4 and an example client search GUI.

FIG. 5 illustrates the example client GUI 450 of FIG. 4 and an example client search GUI 500. The example client search GUI 500 may include a search input box 505 and a virtual keyboard 510 that may be used to provide input to a STB. The example client search GUI 500 may be presented in response to a long press by a user on a touch screen of the client device. Various behaviours of the virtual keyboard 510 may be as follows: tapping on any key may input the applicable alphabet or special characters to the client device and may cause a display of the same result on the search text input box on the STB, when typing any letters in a search box on the client device, "Enter" key switches to "OK" or an applicable label while a confirmation is also displayed on the STB, tapping on a "Cancel" icon within the text entry box may delete alphabets and reset the text entry box, tapping a "Close" icon may dismiss the virtual keyboard 510. In at least one embodiment, search results may be displayed on the STB and not on the client device. Alternatively or additionally, search results may be displayed on both the STB and the client device. The virtual keyboard 510 may include an "enter" or "done" or similar button that, when activated, causes the STB to perform or confirm an action. If the user takes over control with his STB, such as via a STB remote, the STB can send a message to the client device to dismiss the virtual keyboard 510.

Figure 6:
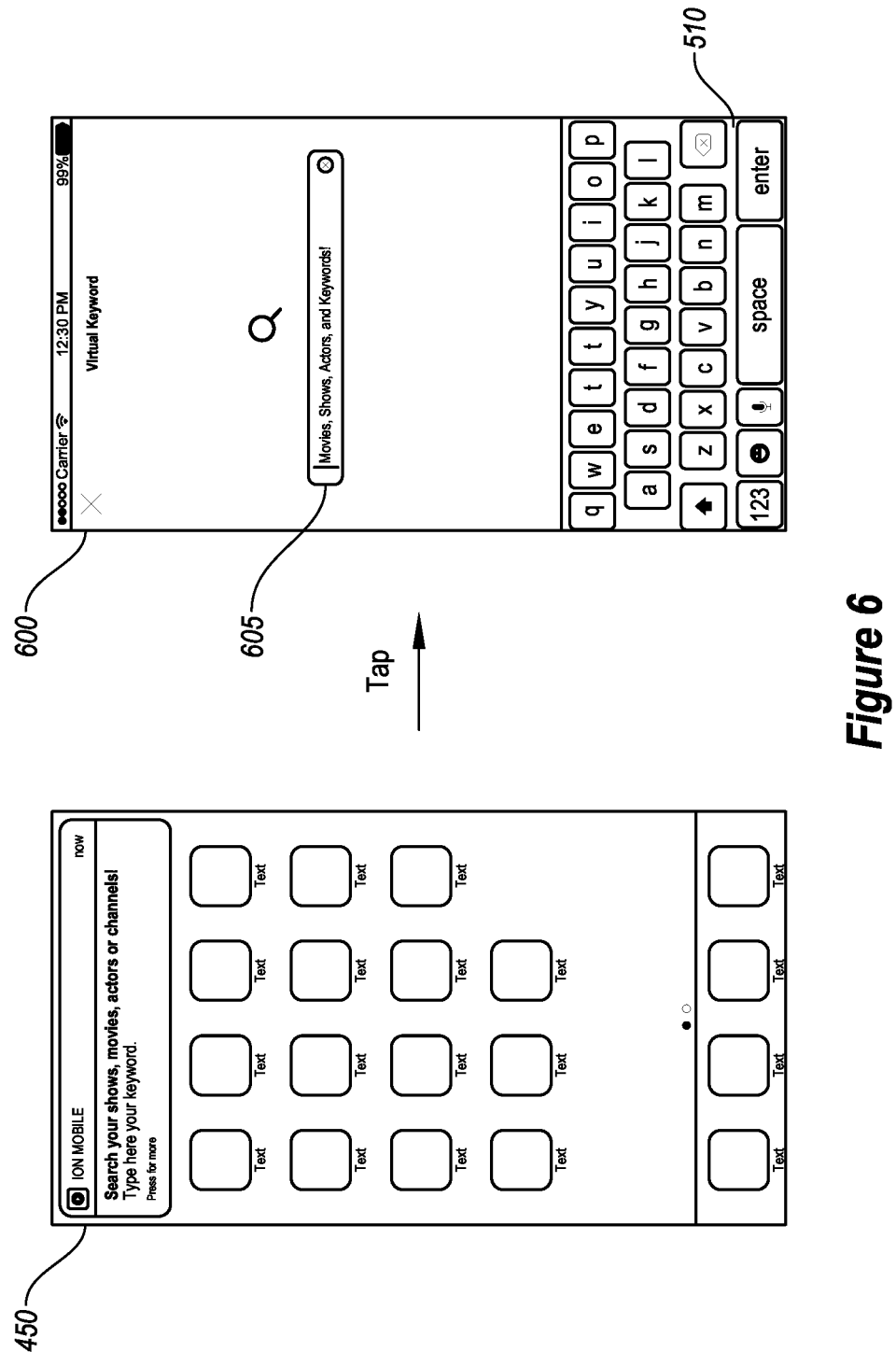
FIG. 6 illustrates the example client GUI of FIG. 4 and another example client search GUI.

FIG. 6 illustrates the example client GUI 450 of FIG. 4 and another example client search GUI 600. The example client search GUI 600 may include a search input box 605 and the virtual keyboard 510 that may be used to provide input to a STB. The example client search GUI 500 may be presented in response to a tap by a user on a touch screen of the client device.

Figure 7:
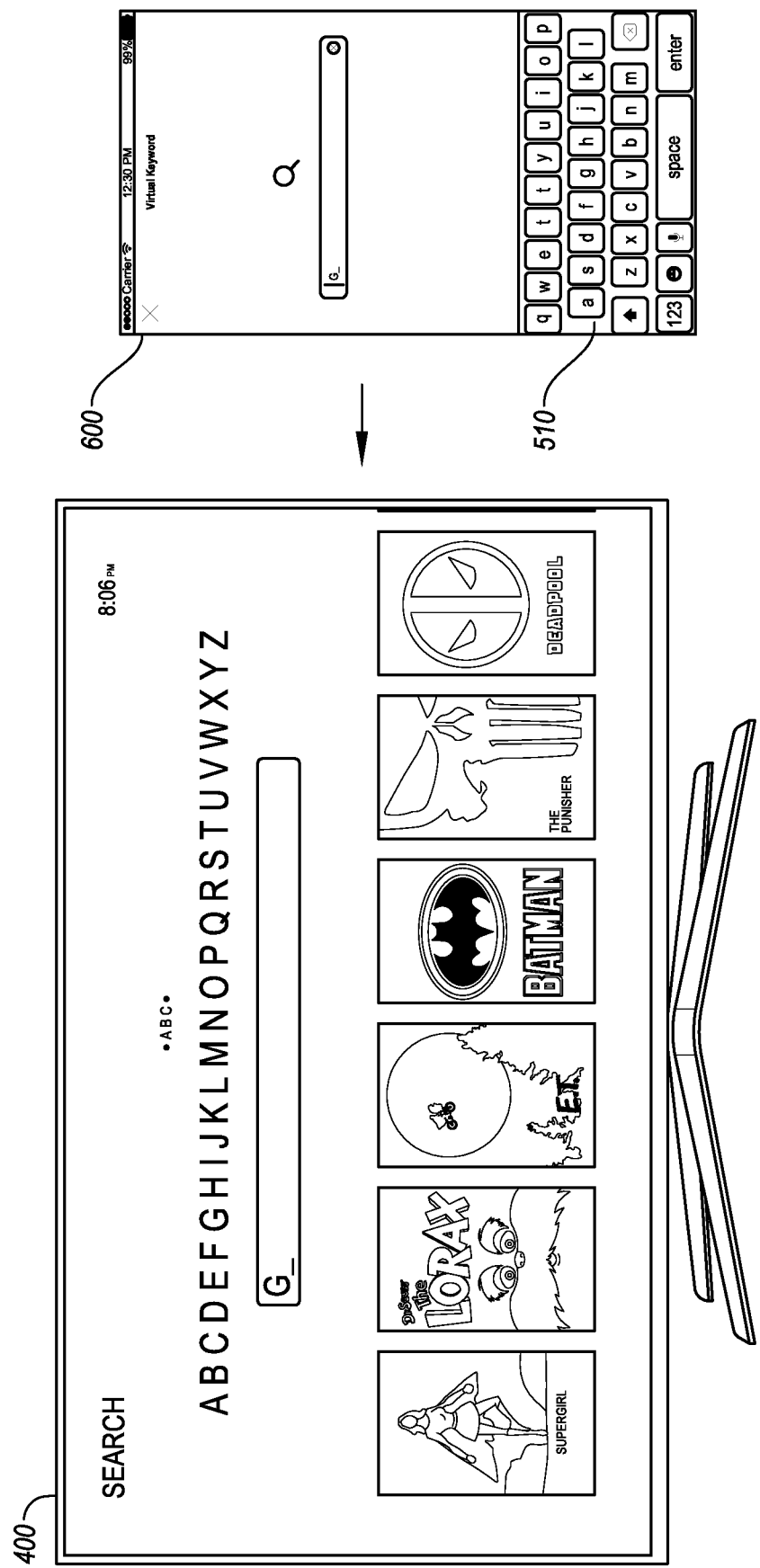
FIG. 7 illustrates another example client user interface with a virtual keyboard that simultaneously updates a user interface associated with a set-top box.

There may be multiple ways to activate the virtual keyboard 510 depending on button behavior, such as a force-click (e.g., on press, on hold) or tapping the notification may open the virtual keyboard 510 within a media application. For example, a user receives a notification on his phone when he navigates to the STB search GUI 400 as illustrated in FIG. 4. Selecting the notification may activate a virtual keyboard 510, as illustrated in FIGS. 5 and 6. As the user provides input to the client device via the virtual keyboard 510, the text input may simultaneously appear on the STB search GUI 400 and the client search GUI 600 as illustrated in FIG. 7.

Figure 8:
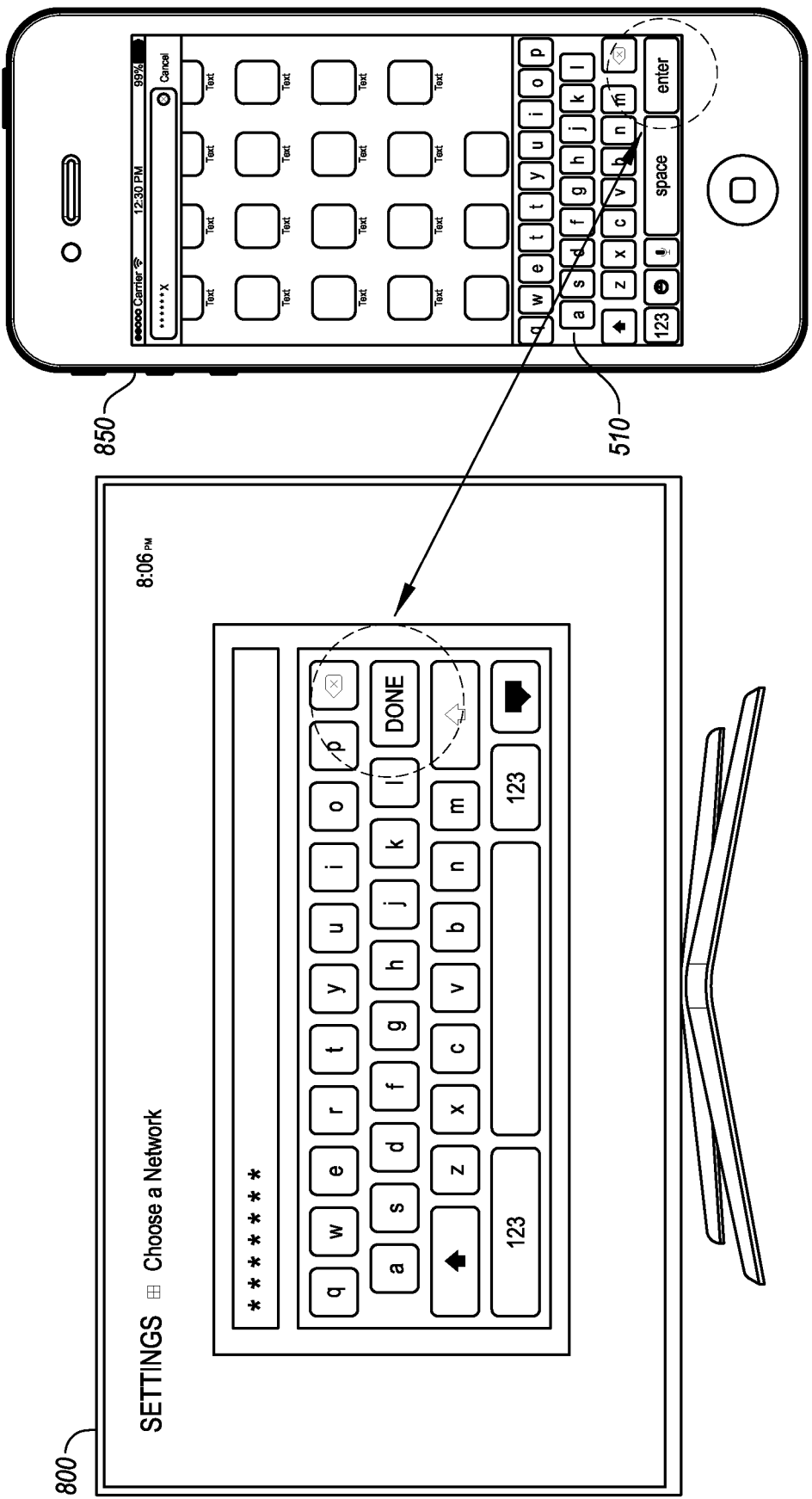
FIG. 8 illustrates an example set-top box password GUI and an example client password GUI.

FIG. 8 illustrates an example STB password GUI 800 and an example client password GUI 850. For example, the STB password GUI 800 and the client password GUI 850 may request a password from the user. In an example, a user may navigate to the STB password GUI 800 that requests a user password. In response to the user navigating to the STB password GUI 800, the STB may send a message to the client device. The client device may display a notification of the message. A user may respond by tapping on the notification. In response, the client password GUI 850 may present the virtual keyboard 510. The user tapping on any key may type the applicable alphabet or special character to the client device. The typed characters may be presented on the STB password GUI 800. In at least some embodiments, the STB password GUI 800 and the client password GUI 850 may mask or obscure characters that been entered into the password field. After entering the correct password, a "enter" label on the virtual keyboard 510 as well as on the STB password GUI 800 may switch to "Done." The user tapping on "Done" may dismiss the client password GUI 850 and the STB password GUI 800 and then advance to another GUI on the STB.

Figure 9:
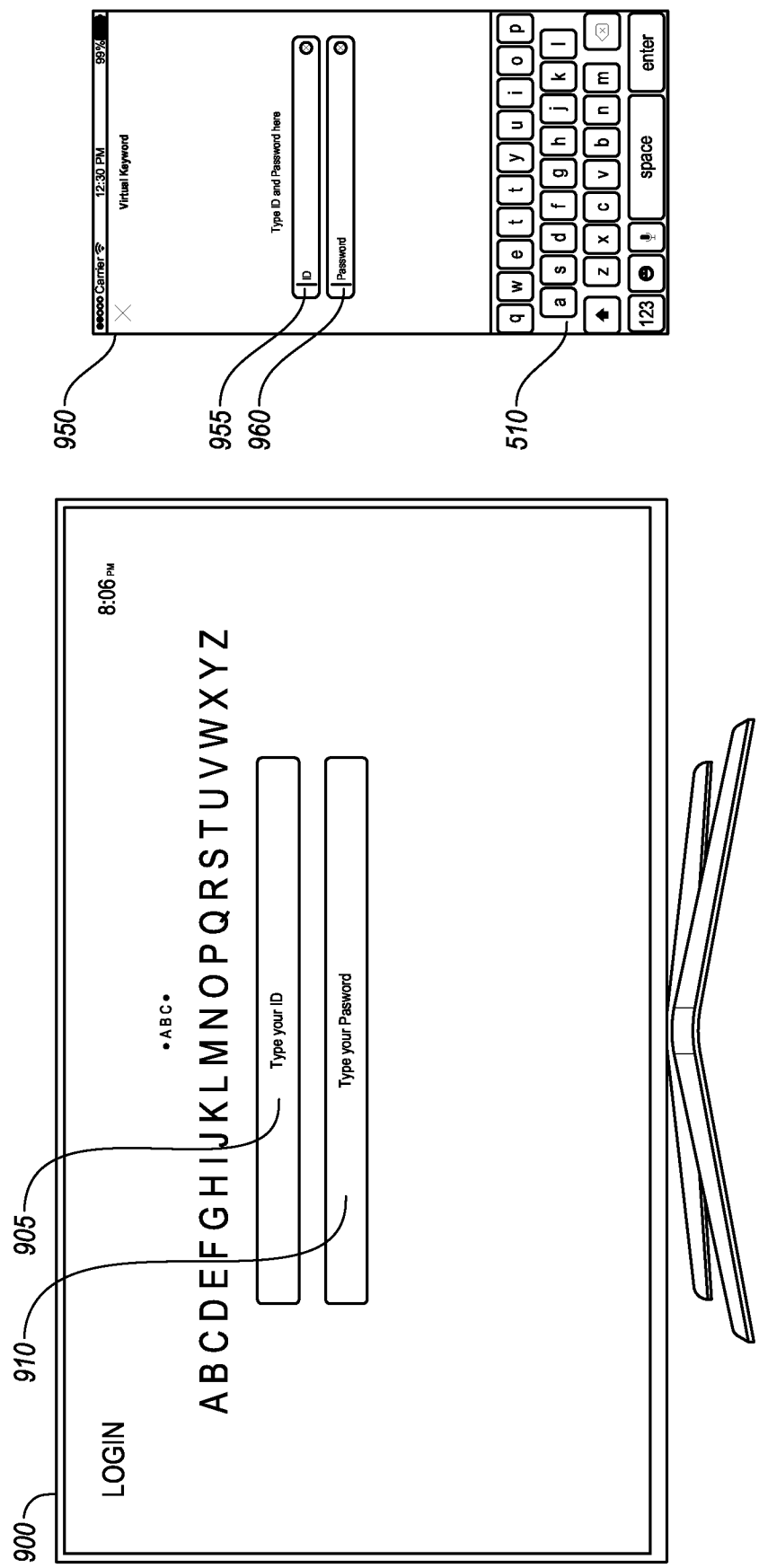
FIG. 9 illustrates an example set-top box GUI for username and password entry and a corresponding client GUI for username and password entry.

FIG. 9 illustrates an example STB GUI 900 for username and password entry and a corresponding client GUI 950 for username and password entry. The client GUI 950 includes the virtual keyboard 510, a username input field 955 and a password input field 960. As discussed, text entry to the client GUI 950 may be simultaneously presented at the STB GUI 900.

Figure 10:
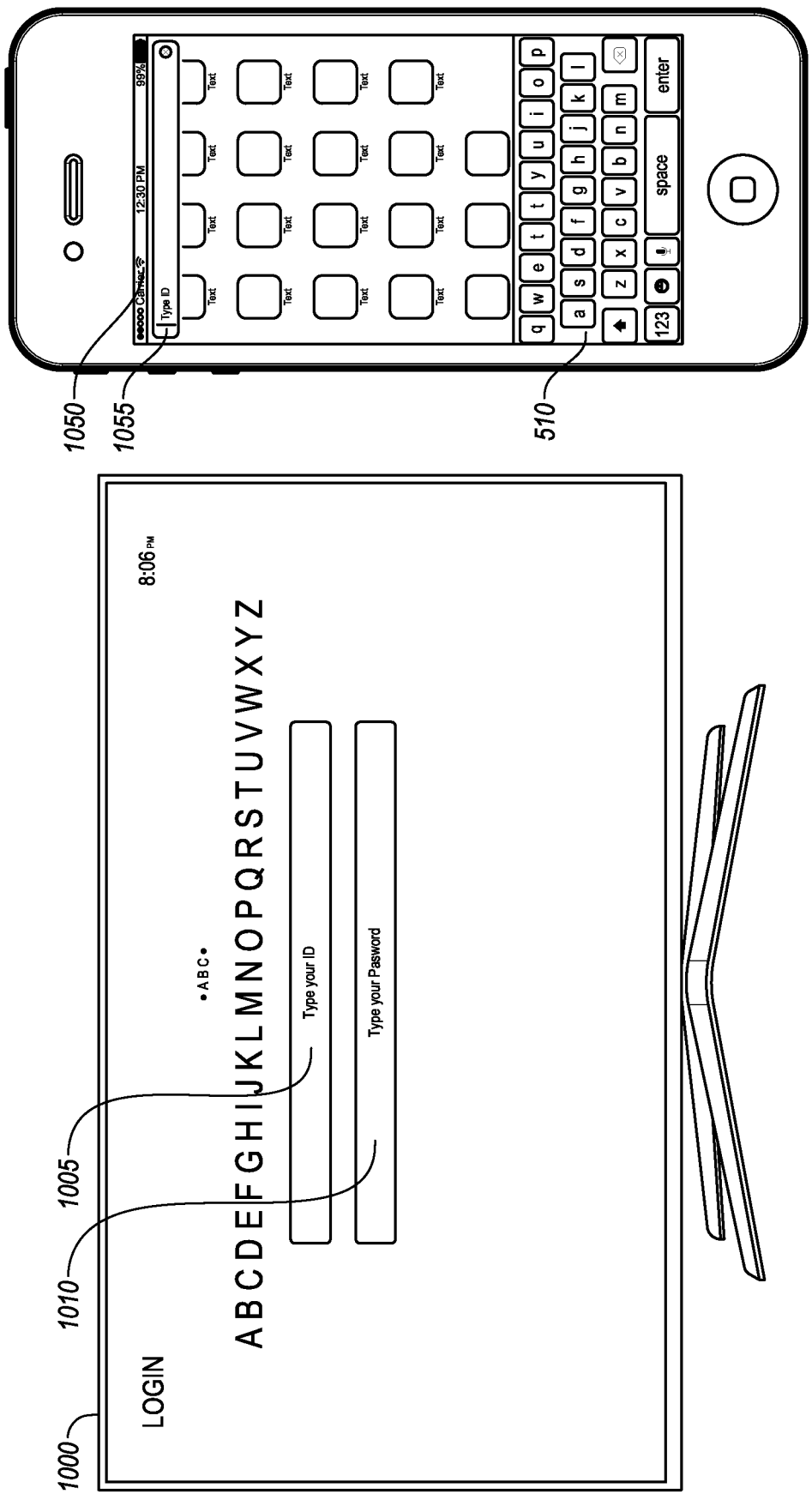
FIG. 10 illustrates another example set-top box GUI and corresponding client GUI.

FIG. 10 illustrates another example STB GUI 1000 and corresponding client GUI 1050. The STB GUI 1000 may include two or more input fields. As illustrated, the STB GUI 1000 includes a username input field 1005 and a password input field 1010. The client GUI 1050 may include a single input field 1055 and the virtual keyboard 510. The user may toggle between the username input field 1005 and a password input field 1010 and may enter text into the username input field 1005 and a password input field 1010 using the single input field 1055.

Figure 11:
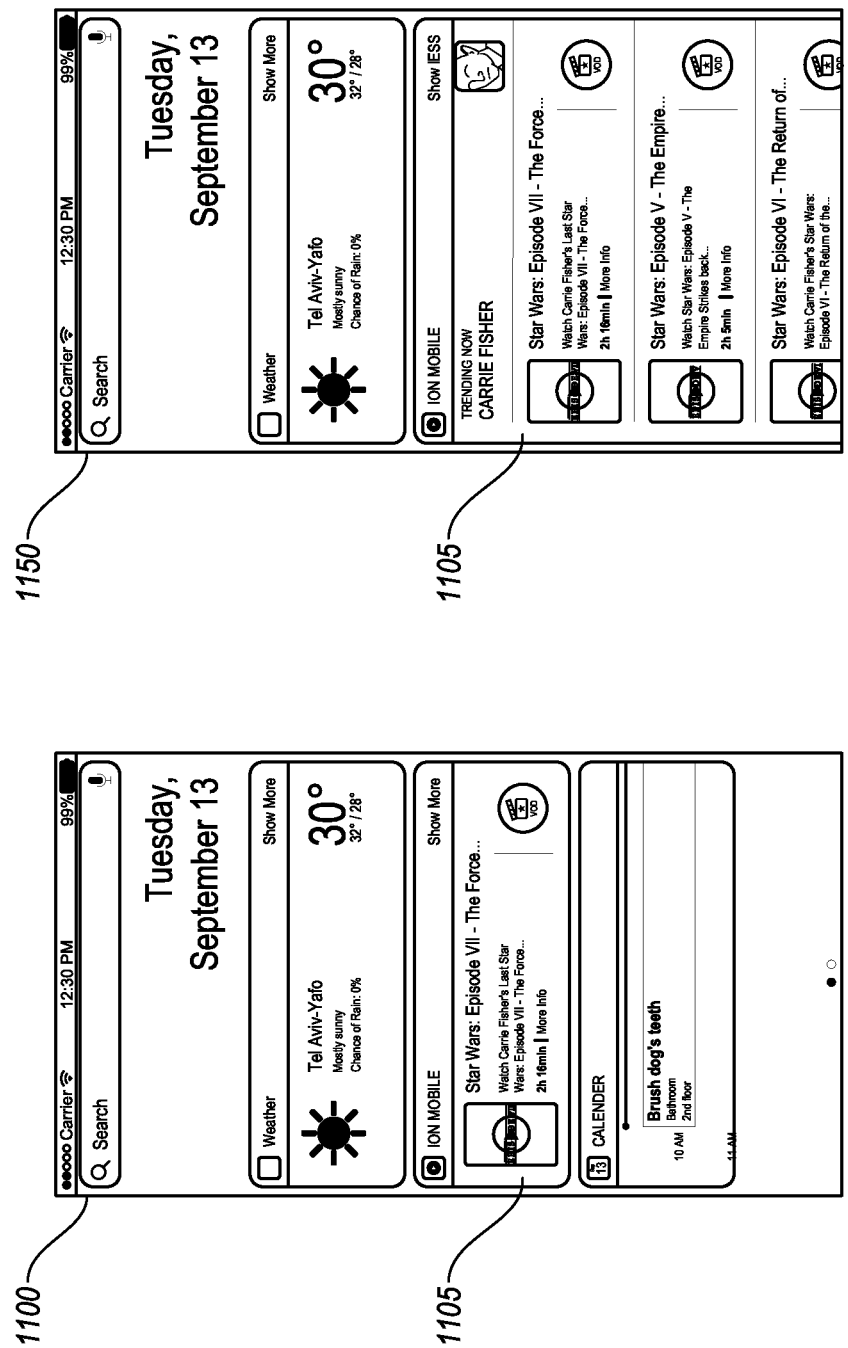
FIG. 11A illustrates an example client GUI with a widget that can receive input for a set-top box.
FIG. 11B illustrates another example client GUI where the widget is in an expanded mode.

FIG. 11A illustrates an example client GUI 1100 with a widget 1105 that can receive input for a set-top box. The widget 1105 may include show art, a play icon, a show title, time info, a network logo, and a channel, among other items. The client device may display the widget 1105, for example, when a content provider pushes a message that includes information about the show, special events or promotions, a group of recommended items, or a static category recommendation (such as "prime time" or trending, etc.), among others. The widget 1105 may display multiple content items, each clickable to play the content item on the STB and/or on the client device. The widget 1105 may be expanded by the user to show more content or other categories. GUI 1100 illustrates the media notification in a collapsed mode. FIG. 11B illustrates another example client GUI 1150 where the widget 1105 is in an expanded mode.

Figure 12:
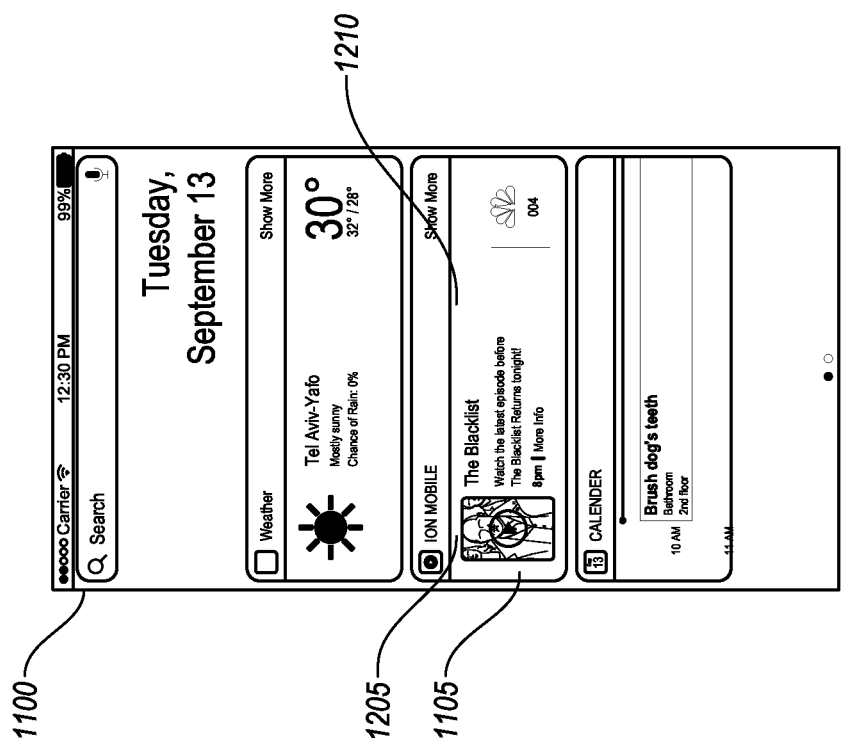
FIG. 12 illustrates the example client GUI with the widget and different regions that may include activation tools.

FIG. 12 illustrates the example client GUI 1100 with the widget 1105 and different regions that may include activation tools that may be activated. Any number of regions may include activation tools. As illustrated, the widget 1105 includes two activation tools 1205 and 1210. Activation behaviours for the widget 1105 may include the user tapping the activation tool 1205 (which is illustrated with a "Play" icon on show art), which may initiate playback of the widget content on the STB if STB is on. If the widget content video is not available, then a selection of the activation tool 1205 may cause the client device to launch an interface into that item's media card (e.g., for a future event or a scheduled event where the user has previously set up a reminder). The user tapping the second activation tool 1210 (which is illustrated with a "Play" icon on show art) may open a media player and playback the widget content if the STB is off. The user tapping the second activation tool 1210 may launch into that item's media card. The widget may also include a "Show More" option. A user can click on "Show More" on the widget 1105 which may cause the widget to expand to the bottom and reveal more contents.

Figure 13:
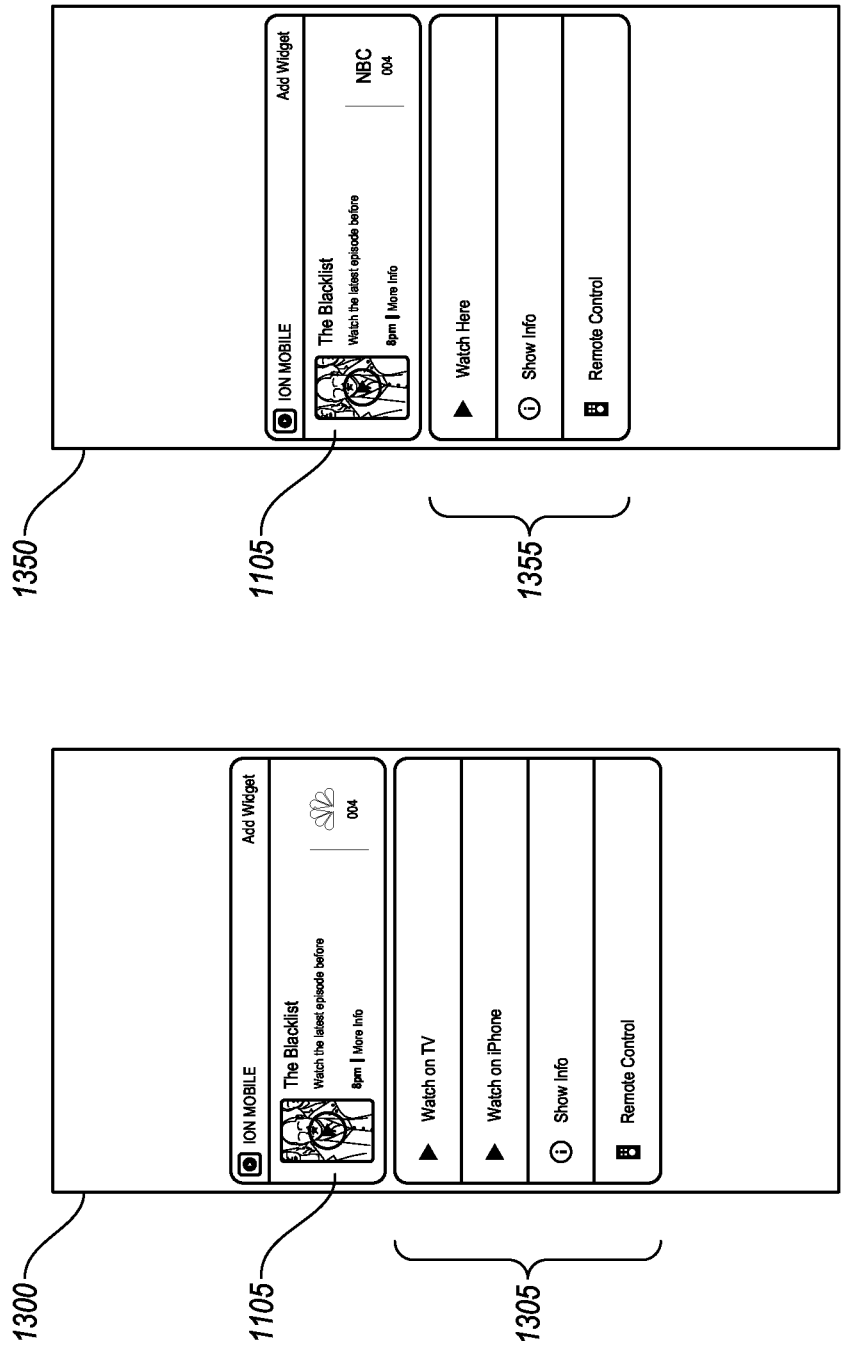
FIG. 13A illustrates an example client GUI that includes a widget and different selectable options.
FIG. 13B illustrates an example client GUI that includes a widget and different selectable options where the client device is not close to a set-top box.

FIG. 13A illustrates an example client GUI 1300 that includes the widget 1105 and different selectable options 1305. The widget 1105 may be activated with force-activated inputs. Upon activation of the widget, such as with the activation tool 1205, the activation tool 1210, or another activation tool (e.g., the "Show More" activation tool on the widget 1105), the client GUI 1300 may present the different selectable options 1305. When the STB is on and playing content, the different selectable options 1305 may include a "Watch on TV" option, a "Watch on Phone," option, a "Show Info" option, and a "Remote Control" option. Other selectable options may be used . . . . Behaviours may include the user tapping "Watch on TV" which may cause the STB to playback the show, tapping "Watch on Phone" which may cause the client device to playback the show, tapping "Show Info" to view more information about the show, and tapping "Remote Control" to launch a remote control interface.

FIG. 13B illustrates an example client GUI 1350 that includes the widget 1105 and different selectable options 1355 where the client device is not close to the STB. When the STB is on and playing content, the different selectable options 1355 may include a "Watch Here" option, a "Show Info" option, and a "Remote Control" option. Other selectable options may be used. Behaviours may include the user tapping "Watch here" which may cause the client device to playback the show, tapping "Show Info" to view more information about the show, and tapping "Remote Control" to launch a remote control interface.

Figure 14:
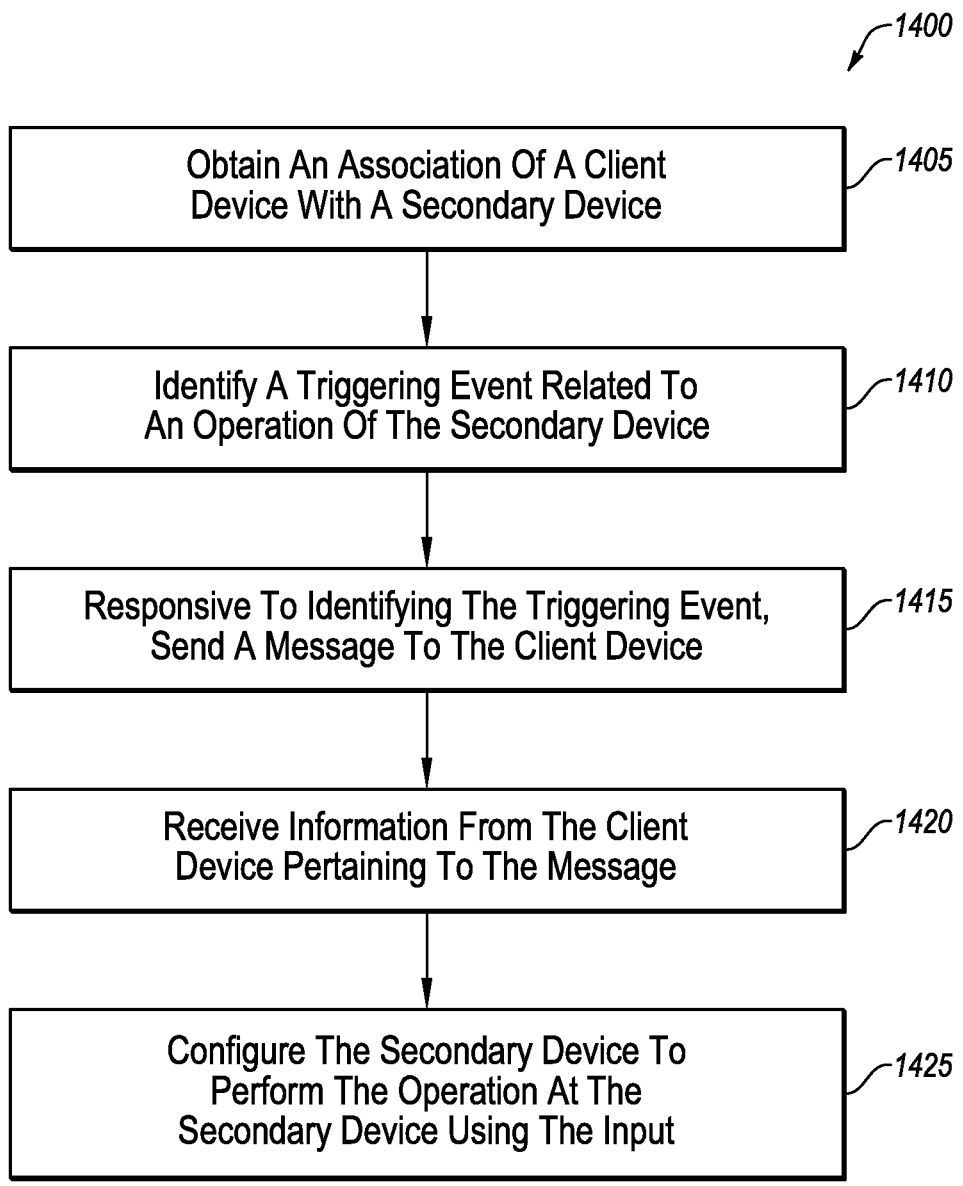
FIG. 14 illustrates an example flow diagram of a method for a set-top box to send and receive messages from a client device.
Figure 15:
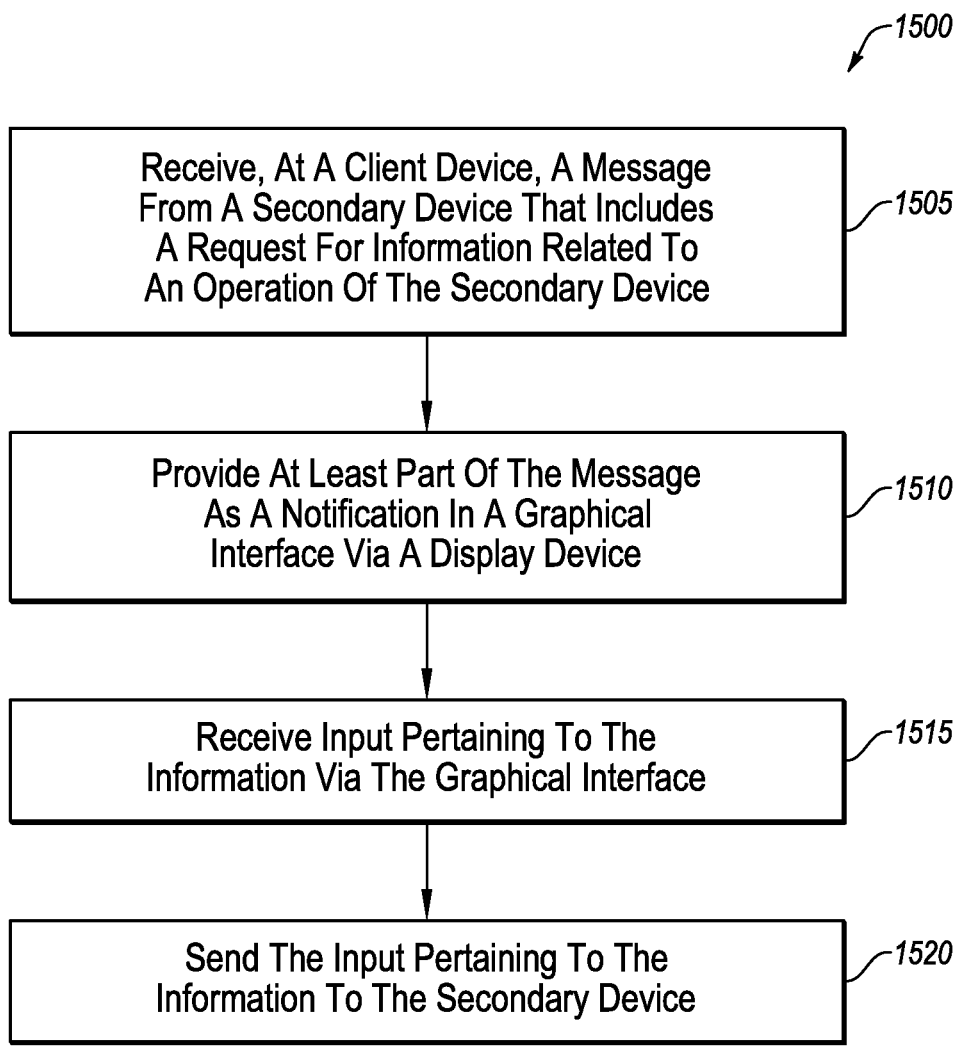
FIG. 15 illustrates an example flow diagram of a method for client device to receive messages from a set-top box.

FIGS. 14-15 illustrate flow diagrams of various methods related to device control using interactive notifications. The methods may be performed by processing logic that may include hardware (circuitry, dedicated logic, etc.), software (such as is run on a computer system or a dedicated machine), or a combination of both, which processing logic may be included in the television 102, the STB 104, the client device 106, the content server 110, the account server 114, or another computer system or device. For simplicity of explanation, methods described herein are depicted and described as a series of acts. However, acts in accordance with this disclosure may occur in various orders and/or concurrently, and with other acts not presented and described herein. Further, not all illustrated acts may be required to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

FIG. 14 illustrates an example flow diagram of a method for a set-top box to send and receive messages from a client device that may be implemented in the operating environment of FIG. 1, arranged in accordance with at least one embodiment described in the present disclosure.

The method 1400 may begin at block 1405, where processing logic may obtain an association of a client device with a secondary device. Obtaining the association of the client device with the secondary device may include adding the secondary device and the client device to a user account. In at least some embodiments, obtaining the association of the client device with the secondary device includes searching for available devices on a network, discovering one or both of the secondary device and client device on the network, and associating the secondary device and client device responsive to discovering the one or both of the secondary device and the client device on the network. In at least some embodiments, obtaining the association of the client device with the secondary device may include receiving a selection or confirmation of the client device being associated with the secondary device.

At block 1410, the processing logic may identify a triggering event related to an operation of the secondary device. In at least some embodiments, identifying the triggering event related to the operation of the secondary device may include receiving, at the secondary device, input to perform the operation. The triggering event related to the operation of the secondary device may include a time-based event, a user status-based event, or a client device location-based event. In at least some embodiments, identifying the triggering event related to the operation of the secondary device includes providing, on the secondary device, a selectable on-screen button to use a keyboard on the client device to provide the information to the secondary device, and receiving an activation of the selectable on-screen button to use the keyboard on the client device to provide the information to the secondary device.

At block 1415, the processing logic may send a message to the client device with a request for information related to the operation of the secondary device responsive to identifying the triggering event. The client device may have a user interface configured to receive the information. In at least some embodiments, sending the message to the client device may include determining where to send the message to the client device by identifying the client device is connected to the same network as the secondary device or querying a user account for associated devices to identify the client device. The message may include an instruction for the client device to provide an interactive notification via the user interface. The interactive notification may include at least one of an application name, an icon, and an image associated with the operation of the secondary device.

At block 1420, the processing logic may receive input pertaining to the information from the client device. The input pertaining to the information may include at least one of an alphanumeric input, a selection of a media item, a scroll, a rewind, a fast forward, a pause, a stop, or a play. In at least some embodiments, receiving the input pertaining to the information from the client device may include presenting the input pertaining to the information from the client device in a secondary device interface. In at least some embodiments, the input pertaining to the information from the client device may be presented in the secondary device interface and the user interface at the client device at substantially a same time.

At block 1425, the processing logic may configure or cause the secondary device to perform the operation at the secondary device using the input pertaining to the information from the client device. In at least some embodiments, configuring or causing the secondary device to perform the operation may include at least one of: entering alphanumeric input in a secondary device interface, selecting a media item in the secondary device interface, scrolling in the secondary device interface, rewinding the media item, fast forwarding the media item, pausing the media item, stopping the media item, or playing the media item.

For this and other processes and methods disclosed herein, the functions performed in the processes and methods may be implemented in differing order. Further, the outlined steps and operations are only provided as examples, and some of the steps and operations may be optional, combined into fewer steps and operations, or expanded into additional steps and operations without detracting from the essence of the disclosed embodiments.

FIG. 15 illustrates an example flow diagram of a method for client device to receive messages from a secondary device that may be implemented in the operating environment of FIG. 1, arranged in accordance with at least one embodiment described in the present disclosure.

The method 1500 may begin at block 1505, where processing logic may receive, at a client device, a message from a secondary device that includes a request for information related to an operation of the secondary device. In at least some embodiments, receiving the information via the graphical interface pertaining to the notification may include receiving an instruction to open an application or a media card associated with the notification.

At block 1510, the processing logic may provide at least part of the message as a notification in a graphical interface via a display device. In at least some embodiments, providing at least part of the message as the notification in the graphical interface via the display device may include providing an option to play a media item at the secondary device when the client device and the secondary device are connected to the network.

At block 1515, the processing logic may receive the input pertaining to the information via the graphical interface. In at least some embodiments, the input pertaining to the information may include at least one of an alphanumeric input, a selection of a media item, a scroll, a rewind, a fast forward, a pause, a stop, or a play. At block 1520, the processing logic may send the input pertaining to the information to the secondary device to perform the secondary device operation.

For this and other processes and methods disclosed herein, the functions performed in the processes and methods may be implemented in differing order. Further, the outlined steps and operations are only provided as examples, and some of the steps and operations may be optional, combined into fewer steps and operations, or expanded into additional steps and operations without detracting from the essence of the disclosed embodiments.

Figure 16:
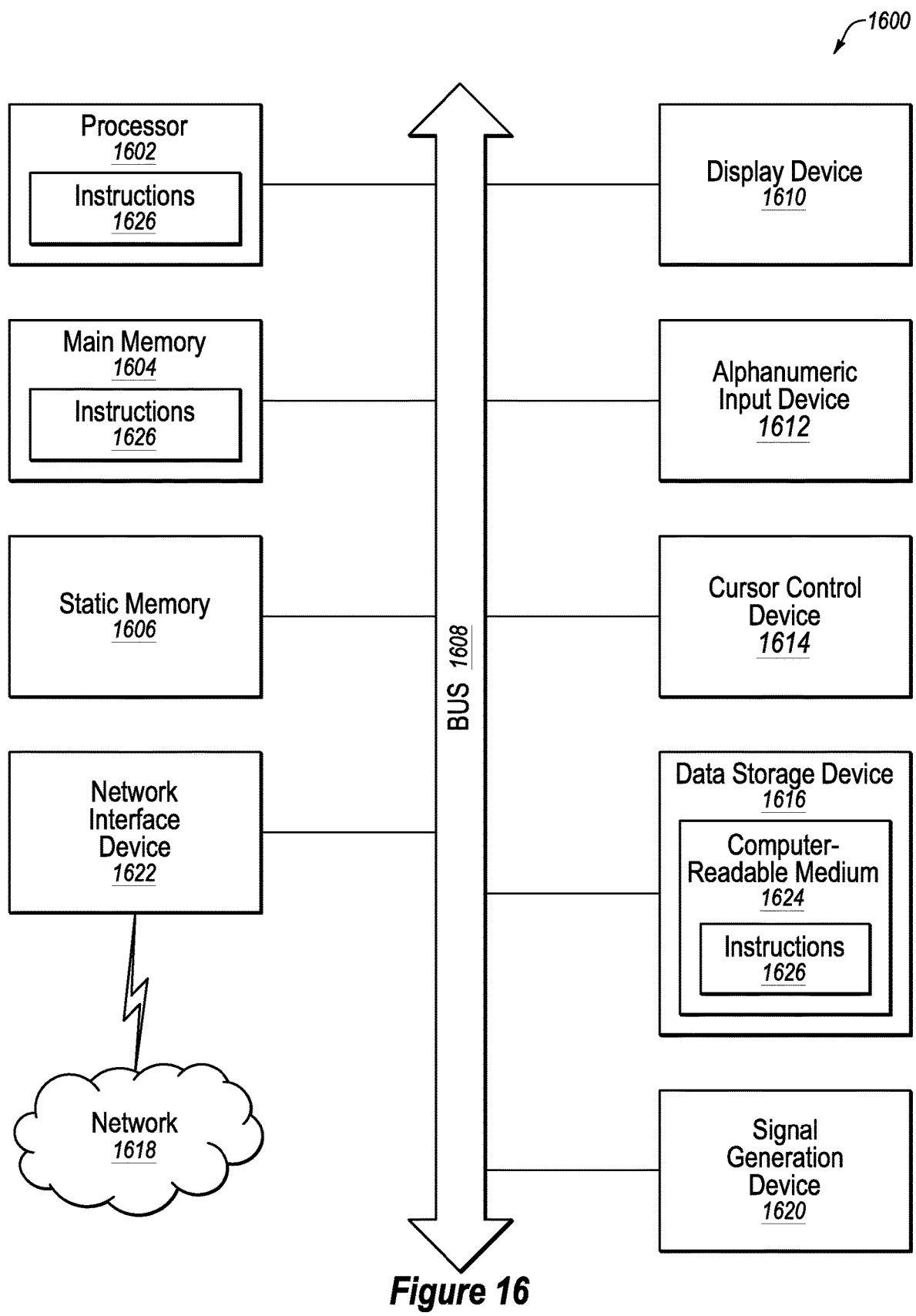
FIG. 16 illustrates a diagrammatic representation of a machine in an example form of a computing device within which a set of instructions, for causing the machine to perform any one or more of the methods discussed herein, may be executed.

FIG. 16 illustrates a diagrammatic representation of a machine in the example form of a computing device 1600 within which a set of instructions, for causing the machine to perform any one or more of the methods discussed herein, may be executed. The computing device 1600 may include a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methods discussed herein, may be executed. In alternative embodiments, the machine may be connected (e.g., networked) to other machines in a LAN, an intranet, an extranet, or the Internet. The machine may operate in the capacity of a server machine in client-server network environment. The machine may include a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methods discussed herein.

The example computing device 1600 includes a processing device (e.g., a processor) 1602, a main memory 1604 (e.g., read-only memory (ROM), flash memory, dynamic random access memory (DRAM) such as synchronous DRAM (SDRAM)), a static memory 1606 (e.g., flash memory, static random access memory (SRAM)) and a data storage device 1616, which communicate with each other via a bus 1608.

Processing device 1602 represents one or more general-purpose processing devices such as a microprocessor, central processing unit, or the like. More particularly, the processing device 1602 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1602 may also include one or more special-purpose processing devices such as an application specific integrated circuit (ASIC), a field programmable gate array (FPGA), a digital signal processor (DSP), network processor, or the like. The processing device 1602 is configured to execute instructions 1626 for performing the operations and steps discussed herein.

The computing device 1600 may further include a network interface device 1622 which may communicate with a network 1618. The computing device 1600 also may include a display device 1610 (e.g., a liquid crystal display (LCD) or a cathode ray tube (CRT)), an alphanumeric input device 1612 (e.g., a keyboard), a cursor control device 1614 (e.g., a mouse) and a signal generation device 1620 (e.g., a speaker). In one implementation, the display device 1610, the alphanumeric input device 1612, and the cursor control device 1614 may be combined into a single component or device (e.g., an LCD touch screen).

The data storage device 1616 may include a computer-readable storage medium 1624 on which is stored one or more sets of instructions 1626 embodying any one or more of the methods or functions described herein. The instructions 1626 may also reside, completely or at least partially, within the main memory 1604 and/or within the processing device 1602 during execution thereof by the computing device 1600, the main memory 1604 and the processing device 1602 also constituting computer-readable media. The instructions may further be transmitted or received over a network 1618 via the network interface device 1622.

While the computer-readable storage medium 1626 is shown in an example embodiment to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

Figure 17:
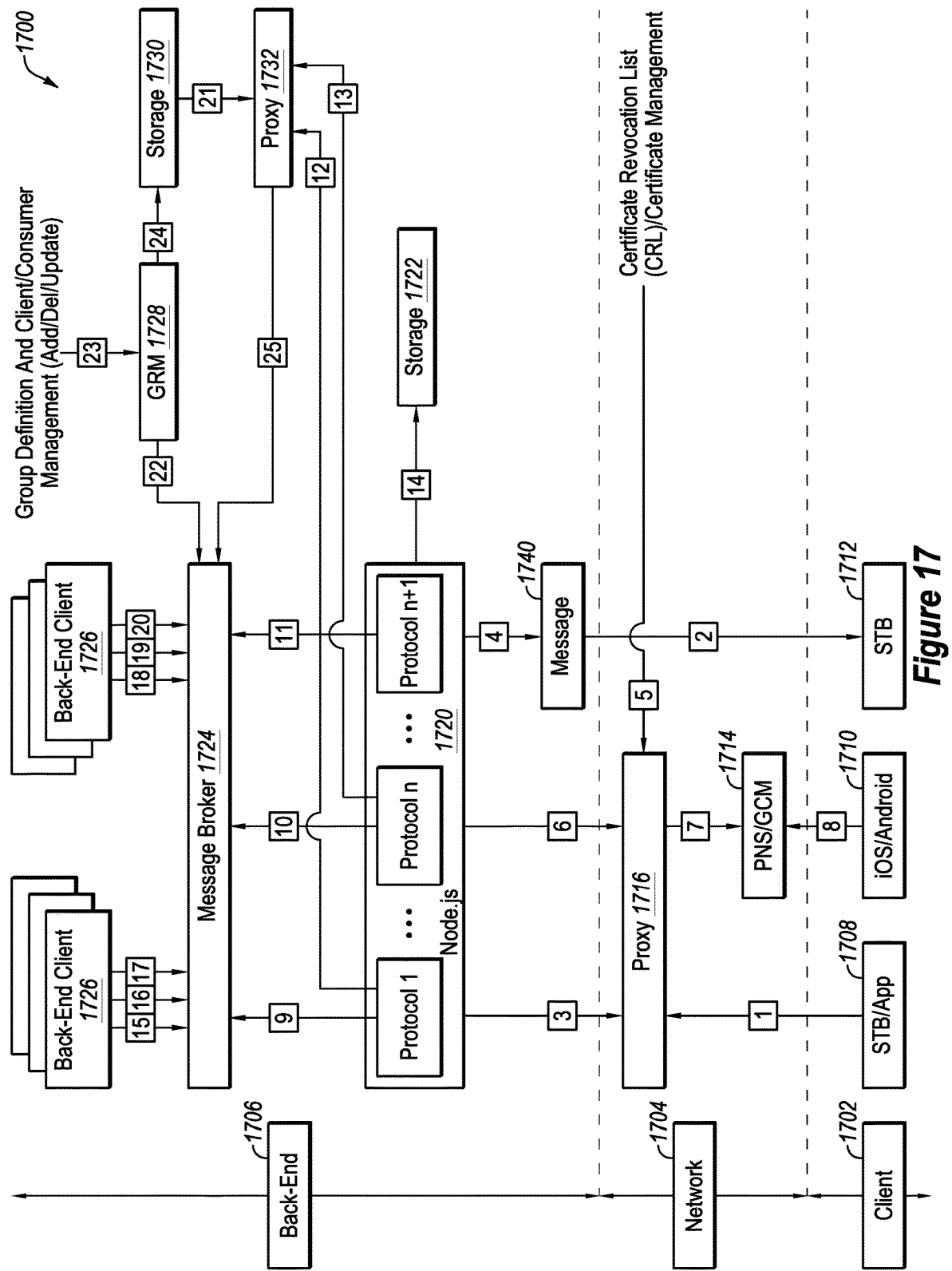
FIG. 17 illustrates an example architecture for providing a message to one or more devices in a platform-independent environment.

FIG. 17 illustrates an example architecture 1700 for providing a message to one or more devices in a platform-independent environment. The architecture 1700 may include a client 1702 that may communicate over a network 1704 with a back end 1706.

The client 1702, may, for example, include any type of client device (including the client device 106 of FIG. 1), which may also include a STB/app 1708, an iOS® or Android®-based client device 1710, or an STB 1712. The client device 1702 may communicate with the back end 1706 with or without a push notification service (PNS) 1714 (e.g., Apple® PNS, Google Cloud Messaging®, etc.). The client device 1702 may communicate with the back end 1706 with or without a proxy 1716 (e.g., a proxy server, a reverse proxy).

The back end 1706 may include a cross-platform run-time environment 1720, such as Node.js. The cross-platform run-time environment 1720 may use and support any number of protocols (e.g., Protocol 1, Protocol n, Protocol n+1). The cross-platform run-time environment 1720 may be coupled to a data storage 1722, such as an in-memory data structure store (e.g., redis).

The back end 1706 may also include a message broker 1724 that may be coupled to any number of back-end clients 1726. The message broker may also be coupled to a group management suite (GRM) 1728. The GRM 1728 may receive a request to add, delete, or update a group definition or a client management parameter. In response to the request, the GRM 1728 may add, delete, or update the group definition or the client management parameter. The GRM 1728 may be coupled to a data storage 1730. In at least one embodiment, the GRM 1728 and/or the storage 1732 may be coupled to a proxy 1732.

The cross-platform run-time environment 1720 may receive input from a first client device (e.g., the client device 1710) and may send the input to the cross-platform run-time environment 1720 via the network 1704. In at least one embodiment, the first client device may send the input via the PNS 1714 and/or proxy 1716. In at least one embodiment, the input may be provided according to or in a format of a first protocol (e.g., protocol 1). The cross-platform run-time environment 1720 may translate or convert the input to a second protocol that may be compatible with a second client device (e.g., a secondary device, the STB 1712). The cross-platform run-time environment 1720 may send the input as a message 1740 to the second client device.

Figure 18:
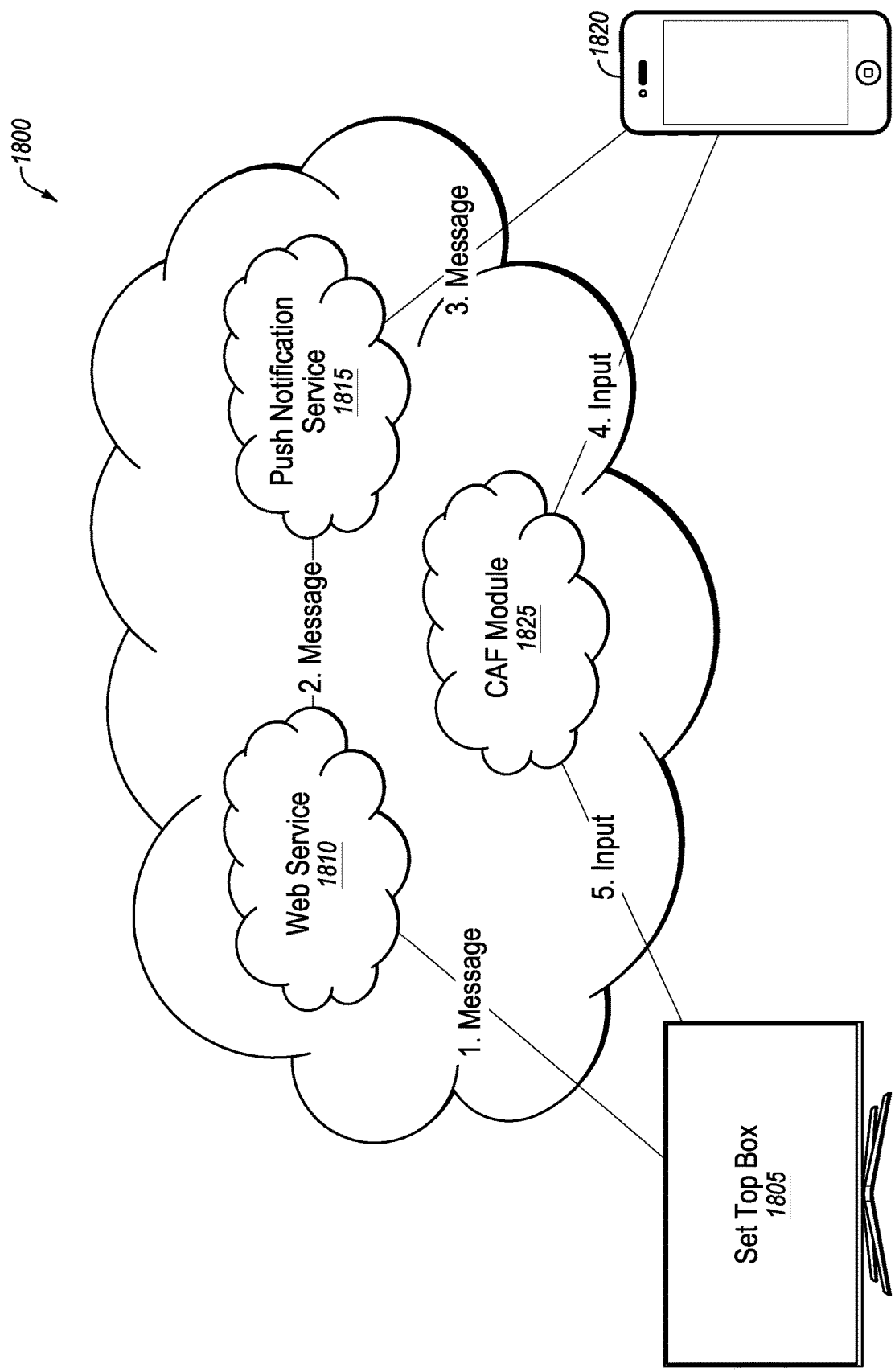
FIG. 18 illustrates an example flow diagram for an interactive notification.

FIG. 18 illustrates an example flow diagram 1800 for an interactive notification. A triggering event at a STB 1805 (which may be the same as or similar to the STB 104 of FIG. 1) may occur. The triggering event may, for example, include a user logging into the STB 1805 with an account. As part of, or in response to the triggering event, the STB 1805 may send a message to a web service 1810. The web service 1810 may include any web-based service that may receive messages and may coordinate the provision of interactive notifications.

The web service 1810 may identify a push notification service 1815 that may be used to send the message to a client device 1820 (which may be the same as or similar to the client device 106 of FIG. 1). The web service 1810 may forward the message to the push notification service 1815. The web service 1810 may also alter, amend, or add to the message before sending the message to the push notification service 1815. The push notification service 1815 may send the message to the client device 1820. The message may include a request for information related to the operation of the STB 1805.

The client device 1820 may include a client device interface configured to present the message and to receive input pertaining to the message. Responsive to receiving input via the client device interface, the client device 1820 may send the input to a CAF module 1825, which may then send the input to the STB 1805. Additionally or alternatively, the client device 1820 may send the input directly to the STB 1805. In this manner, an interactive notification (e.g., the message) may be sent to the client device 1820 and input pertaining to the interactive notification may be received at the client device 1820 and sent to the STB 1805.

Figure 19:
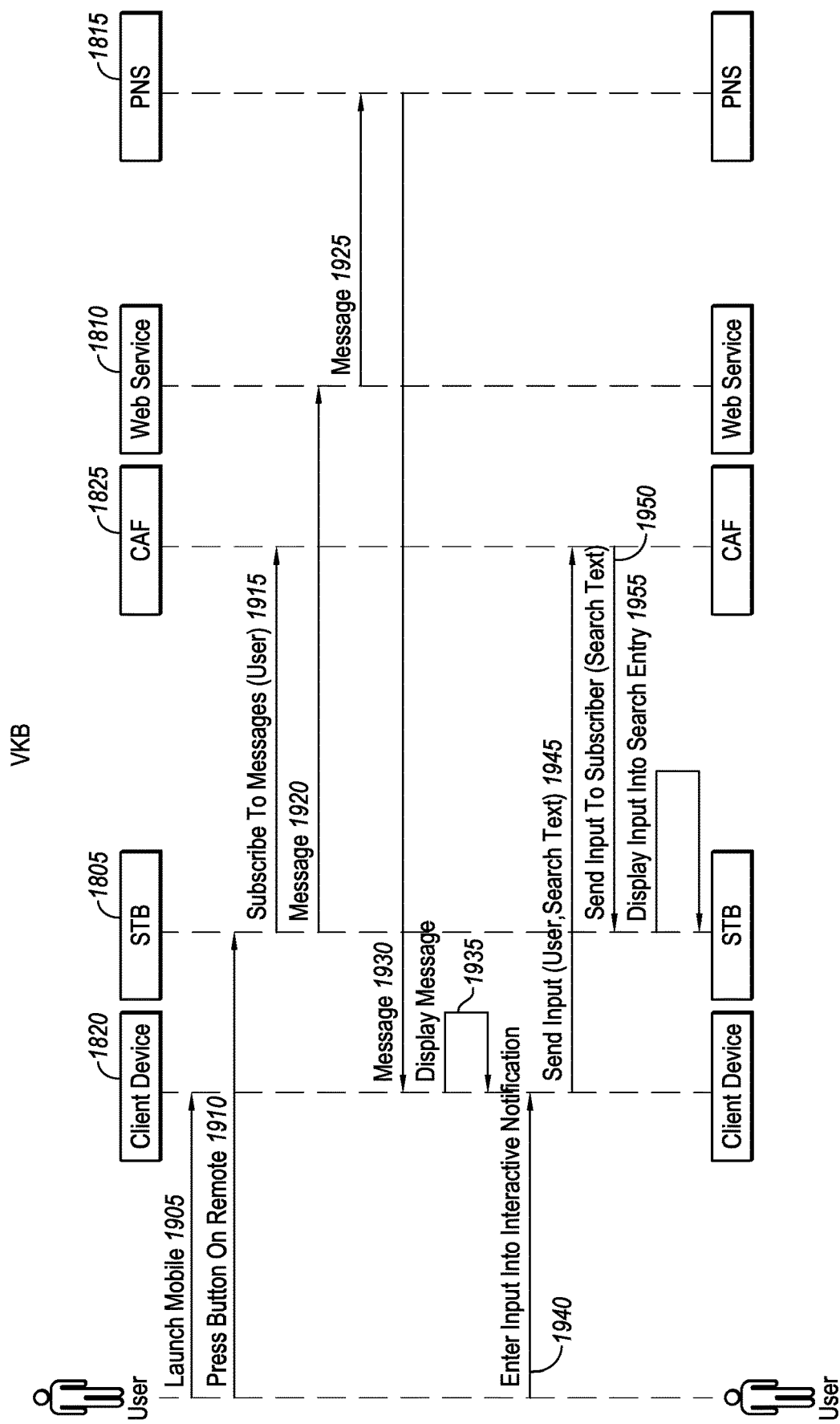
FIG. 19 illustrates a sequence diagram of a process flow for interactive notifications.

FIG. 19 illustrates a sequence diagram 1900 of a process flow for interactive notifications. FIG. 19 may include the STB 1805, the web service 1810, the push notification service (PNS) 1815, the client device 1820, and the CAF module 1825 of FIG. 18.

At 1905, a user of the client device 1820 may launch an application on the client device 1820. At 1910, the user may press a button on a remote control of the STB 1805. At 1915, the STB may subscribe to messages for the CAF module 1825. Using a user interface of the STB 1805, for example, a user may select an option to subscribe to messages of the CAF module 1825. In at least one embodiment, the user may sign up for an account that automatically subscribes that user account to message of the CAF module 1825.

At 1920, a triggering event (such as any triggering event) may cause the STB 1805 to send a message to the web service 1810. At 1925, the web service 1810 may send the message to the PNS 1815. At 1930, the PNS 1815 may send the message to the client device 1820. At 1935, the client device 1820 may display or present the message as an interactive notification. At 1940, the client device 1820 may receive input via a client device interface from the user. At 1945, the client device may send the input to the CAF module 1825.

At 1950, the CAF module 1825 may send the input to the STB 1805. In at least one embodiment, the CAF module 1825 may reformat, supplement, or add data to the input, such as an advertisement, recommendation data, etc.

At 1955, the STB 1805 may display the input via a STB interface. In an example, the input may include text for a search field. The client device 1820 may receive the text for the search field and send the text for the search field to the CAF module 1825. The CAF module 1825 may send the text for the search field to the STB 1805. The STB 1805 may display the text for the search field in the search field.

In the present specification, a detailed description has been given with reference to specific example embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the use of embodiment and other exemplarily language does not necessarily refer to the same embodiment or the same example, but may refer to different and distinct embodiments, as well as potentially the same embodiment.

The following examples pertain to further embodiments.

In one aspect, a method includes obtaining, by a secondary device, an association of a client device with the secondary device. The method further includes identifying, by the secondary device, a triggering event related to an operation of the secondary device. The method further includes responsive to identifying the triggering event, sending, by the secondary device via a network, a message to the client device with a request for information related to the operation of the secondary device. The client device may have a client device interface configured to present the message and to receive input pertaining to the message. The method further includes receiving, by the secondary device via a network, input pertaining to the information from the client device. The input may be received responsive to a presentation of the message via the client device interface. The method further includes configuring the secondary device to perform the operation at the secondary device using the input received from the client device.

Association of the client device with the secondary device can include a user account associated with the secondary device and the client device. Association of the client device and the secondary device may include an association based on a discovery of both the client device and the secondary device on a same network. The association of the client device and the secondary device may be based on a determination of a location of the client device. Identifying the triggering event related to the operation of the secondary device may include receiving, at the secondary device, a request to perform the operation. The triggering event related to the operation of the secondary device may include a time-based event, a user status-based event, or a client device location-based event. The method may further include, responsive to identifying the triggering event, providing, by the secondary device via a secondary device interface of the secondary device, a selectable on-screen element and responsive to an activation of the selectable on-screen element, sending, by the secondary device via the network, the message to the client device with the request for the information related to the operation of the secondary device. Sending the message to the client device may include configuring the secondary device to receive the input entered in the client device interface responsive to receiving the message. The input may include at least one of an alphanumeric input, a selection of a media item, a scroll, a rewind, a fast forward, a pause, a stop, or a play.

Performing the operation at the secondary device using the input from the client device may include at least one of: entering alphanumeric input in a secondary device interface, selecting a media item in the secondary device interface, scrolling in the secondary device interface, rewinding the media item, fast forwarding the media item, pausing the media item, stopping the media item, or playing the media item. Receiving, via the network, the input from the client device may include presenting the input from the client device in a secondary device interface. The input from the client device may be presented in the secondary device interface and the client device interface at substantially a same time. The message may include an instruction for the client device to provide an interactive notification via the client device interface. The secondary device may include one of a set top box, a smart appliance, an audio/video controller, or a gaming system.

In one aspect, a method includes receiving, at a client device, a message associated with a secondary device that includes a request for information related to an operation of the secondary device. The method further includes providing at least part of the message as a notification in a graphical interface via a display device. The method further includes receiving input pertaining to the information via the graphical interface. The method further includes sending, via a network, the input pertaining to the information to the secondary device to perform the secondary device operation.

Receiving the information via the graphical interface pertaining to the notification can include receiving an instruction to open an application or a media card associated with the notification. Providing at least part of the message as the notification in the graphical interface via the display device can include providing an option to play a media item at the secondary device when the client device and the secondary device can be connected to the network. The information can include at least one of an alphanumeric input, a selection of a media item, a scroll, a rewind, a fast forward, a pause, a stop, or a play.

In one aspect, a non-transitory computer-readable medium having encoded therein programming code executable by a processor to perform or control performance of operations comprising any of the operations described above.

In one aspect, a system including a memory and a processing device operatively coupled to the memory, the processing device being configured to perform or control performance of operations comprising any of the operations described above.

In one aspect, a non-transitory computer-readable medium having encoded therein programming code executable by a processor to perform or control performance of operations to identify a triggering event related to an operation of a secondary device. The programming code executable by the processor to perform or control performance of operations to obtain, by the secondary device, an association of a client device with the secondary device. The programming code executable by the processor to perform or control performance of operations to send, by the secondary device via a network, a message to the client device with a request for information related to the operation of the secondary device responsive to identifying the triggering event. The client device may have a client device interface configured to present the message and to receive input pertaining to the message. The programming code executable by the processor to perform or control performance of operations to receive, by the secondary device via a network, input pertaining to the information from the client device. The input may be received responsive to a presentation of the message via the client device interface. The programming code executable by the processor to perform or control performance of operations to cause a performance of the operation at the secondary device using the information from the client device.

Identifying the triggering event related to the operation of the secondary device can include receiving, at the secondary device, input to perform the operation. Causing the performance of the operation at the secondary device using the information from the client device can include at least one of: entering alphanumeric input in a secondary device interface, selecting a media item in the secondary device interface, scrolling in the secondary device interface, rewinding the media item, fast forwarding the media item, pausing the media item, stopping the media item, or playing the media item.

Terms used herein and especially in the appended claims (e.g., bodies of the appended claims) are generally intended as "open" terms (e.g., the term "including" may be interpreted as "including, but not limited to," the term "having" may be interpreted as "having at least," the term "includes" may be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases may not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" may be interpreted to mean "at least one" or "one or more"); the same holds true for the use of definite articles used to introduce claim recitations.

In addition, even if a specific number of an introduced claim recitation is explicitly recited, those skilled in the art will recognize that such recitation may be interpreted to mean at least the recited number (e.g., the bare recitation of "two recitations," without other modifiers, means at least two recitations, or two or more recitations). Further, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, may be understood to contemplate the possibilities of including one of the terms, either of the terms, or both terms. For example, the phrase "A or B" may be understood to include the possibilities of "A" or "B" or "A and B."

Embodiments described herein may be implemented using computer-readable media for carrying or having computer-executable instructions or data structures stored thereon. Such computer-readable media may be any available media that may be accessed by a computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a computer. Combinations of the above may also be included within the scope of computer-readable media.

Computer-executable instructions may include, for example, instructions and data which cause a computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it may be understood that the various changes, substitutions, and alterations may be made hereto without departing from the spirit and scope of the present disclosure.

What is claimed is:

1. A method, comprising:
    receiving, by a secondary device, a speech signal from a user of a client device;
    determining, by the secondary device, a proximity of the client device relative to the secondary device based on the speech signal;
    comparing the speech signal to a plurality of stored speech signals to identify the user;
    determining a user account based on identifying the user;
    determining, by the secondary device, an association of the client device with the secondary device based on the user account;
    rendering media at the secondary device;
    initiating a secondary-device interface at the secondary device;
    identifying, by the secondary device, a text-entry-triggering event related to the secondary-device interface, by determining that alphanumeric text input is associated with the secondary-device interface that is being rendered, where functionality for entry of alphanumeric text at the secondary device is limited when compared to the client device;
    responsive to identifying the text-entry-triggering event, sending, by the secondary device via a network, a message to the client device, based on the proximity of the client device relative to the secondary device, with a request for information related to the secondary-device interface, the client device having a client-device interface configured to present the message and to receive at least an alphanumeric text input pertaining to the message;
    receiving, by the secondary device via a network, the alphanumeric text input pertaining to the message from the client device, wherein the alphanumeric text input is received responsive to a presentation of the message via the client-device interface;
    presenting each character of the alphanumeric text input in the secondary-device interface at substantially a same time that the alphanumeric text input is being entered into the client-device interface;
    configuring the secondary device to perform an operation at the secondary device using the alphanumeric text input pertaining to the message that is received from the client device; and
    sending, by the secondary device via the network, a notification including an instruction to open an application associated with the notification, wherein the client device is configured to provide the application at the client-device interface.

2. The method of claim 1, wherein the user account is associated with the secondary device and the client device.

3. The method of claim 1, wherein the association of the client device and the secondary device further comprises:
    an association based on a discovery of both the client device and the secondary device on a same network.

4. The method of claim 1, wherein the association of the client device and the secondary device is further based on a determination of a location of the client device.

5. The method of claim 1, further comprising:
    responsive to identifying the text-entry-triggering event, providing, by the secondary device via the secondary-device interface, a selectable on-screen element; and
    responsive to an activation of the selectable on-screen element, sending, by the secondary device via the network, the message to the client device with the request for the information related to the operation of the secondary device.

6. The method of claim 1, wherein sending the message to the client device comprises configuring the secondary device to receive the alphanumeric text input entered in the client-device interface responsive to receiving the message.

7. The method of claim 1, further comprising receiving at least one of a selection of a media item, a scroll, a rewind, a fast forward, a pause, a stop, or a play.

8. The method of claim 1, wherein the operation at the secondary device comprises at least one of: selecting a media item in a secondary device interface, scrolling in the secondary device interface, rewinding the media item, fast forwarding the media item, pausing the media item, stopping the media item, or playing the media item.

9. The method of claim 1, wherein the message includes an instruction for the client device to provide an interactive notification via the client-device interface.

10. The method of claim 1, wherein the secondary device includes one of a set top box, a smart appliance, an audio/video controller, or a gaming system.

11. A method, comprising:
    receiving, at a client device, a message associated with a secondary device, the message including a request for alphanumeric text input related to media that is being rendered at the secondary device, wherein the request is responsive to a text entry triggering event related to a secondary-device interface that is being rendered at the secondary device, wherein the client device is associated with the secondary device based at least on a proximity of the client device relative to the secondary device determined based on a speech signal from a user of the client device and based on a user account determined based on comparing the speech signal to a plurality of stored speech signals to identify the user of the user account, and wherein functionality for entry of text at the secondary device is limited when compared to the client device;
    presenting the message at a client-device interface;
    receiving, at the client-device interface, alphanumeric text input pertaining to the message associated with the secondary device;
    sending, via a network, each character of the alphanumeric text input pertaining to the secondary-device interface that is being rendered at the secondary device to the secondary device as the alphanumeric text input is being entered into the client-device interface wherein the secondary device is configured to present each character of the alphanumeric text input from the client device in the secondary-device interface at substantially a same time that the alphanumeric text input is being entered into the client-device interface and wherein the secondary device is configured to perform an operation using the alphanumeric text input received from the client device;
    receiving a notification including an instruction to open a media card associated with the notification; and
    providing, at the client-device interface the media card at the secondary device.

12. A non-transitory computer-readable medium of a secondary device having encoded therein programming code executable by a processor to:
- receive a speech signal from a user of a client device;
- determine a proximity of the client device relative to the secondary device based on the speech signal;
- compare the speech signal to a plurality of stored speech signals to identify the user;
- determine a user account based on identifying the user;
- determine an association of the client device with the secondary device based on the user account;
- render media at the secondary device;
- initiate a secondary-device interface at the secondary device;
- identify a text-entry-triggering event related to secondary-device interface that is being rendered at the secondary device, by determining that alphanumeric text input is associated with the secondary-device interface that is being rendered, where functionality for entry of alphanumeric text at the secondary device is limited when compared to a client device;
- responsive to identifying the text-entry-triggering event, send, via a network, a message to the client device, based on the proximity of the client device relative to the secondary device, with a request for information related to the secondary-device interface, the client device having a client-device interface configured to present the message and to receive at least an alphanumeric text input pertaining to the message;
- receive, via a network, the alphanumeric text input pertaining to the message from the client device, wherein the alphanumeric text input is received responsive to a presentation of the message via the client-device interface;
- present each character of the alphanumeric text input in the secondary-device interface at substantially a same time that the alphanumeric text input is being entered into the client-device interface;
- cause a performance of an operation at the secondary device using the alphanumeric text input pertaining to the message that is received from the client device;
- receive a notification including an instruction to provide an option to play a media item at the secondary device; and
- provide the option to play the media item at the secondary device.

13. The non-transitory computer-readable medium of claim 12, wherein the operation at the secondary device comprises at least one of: selecting a media item in a secondary device interface; scrolling in the secondary device interface; rewinding the media item; fast forwarding the media item; pausing the media item; stopping the media item; or playing the media item.

14. The non-transitory computer-readable medium of claim 12, further having encoded therein programming code executable by a processor to:
- responsive to identifying the text-entry-triggering event, provide, via a secondary device interface of the secondary device, a selectable on-screen element; and
- responsive to an activation of the selectable on-screen element, send, via the network, the message to the client device with the request for the information related to the operation of the secondary device.

15. The non-transitory computer-readable medium of claim 12, wherein sending the message to the client device comprises configuring the secondary device to receive the alphanumeric text input entered in the client-device interface responsive to receiving the message.

16. The non-transitory computer-readable medium of claim 12, wherein receiving, via the network, the alphanumeric text input from the client device comprises presenting the alphanumeric text input from the client device in a secondary device interface.

\* \* \* \* \*